US011741108B2

(12) United States Patent
Morton et al.

(10) Patent No.: US 11,741,108 B2
(45) Date of Patent: Aug. 29, 2023

(54) SYSTEM AND METHOD OF INTELLIGENT DETECTION OF DATA MODEL FIELDNAME LINEAGE AND CONTEXT OF PRIVATE INDIVIDUAL DATA IN BUSINESS INTEGRATION PROCESSES

(71) Applicant: BOOMI, LP, Chesterbrook, PA (US)

(72) Inventors: Michael J. Morton, Morrisville, NC (US); Daniel Schwartz, Marlton, NJ (US)

(73) Assignee: BOOMI, LP, Chesterbrook, PA (US)

( * ) Notice: Subject to any disclaimer, the term of this patent is extended or adjusted under 35 U.S.C. 154(b) by 0 days.

(21) Appl. No.: 17/728,975

(22) Filed: Apr. 25, 2022

(65) Prior Publication Data

US 2022/0253446 A1 Aug. 11, 2022

Related U.S. Application Data

(63) Continuation of application No. 16/943,730, filed on Jul. 30, 2020.

(51) Int. Cl.
*G06F 16/2457* (2019.01)
*G06F 16/242* (2019.01)
*G06F 16/29* (2019.01)
*G06F 16/9537* (2019.01)

(52) U.S. Cl.
CPC ...... *G06F 16/24575* (2019.01); *G06F 16/243* (2019.01); *G06F 16/2428* (2019.01); *G06F 16/29* (2019.01); *G06F 16/9537* (2019.01)

(58) Field of Classification Search
None
See application file for complete search history.

(56) References Cited

U.S. PATENT DOCUMENTS

| 7,082,427 B1* | 7/2006 | Seibel | G06F 16/313 |
| | | | 707/E17.084 |
| 2010/0174709 A1* | 7/2010 | Hansen | G06F 16/9537 |
| | | | 726/28 |
| 2011/0082854 A1* | 4/2011 | Eidson | G06F 16/2453 |
| | | | 707/E17.017 |
| 2013/0262443 A1* | 10/2013 | Leida | G06F 16/24534 |
| | | | 707/E17.014 |

(Continued)

*Primary Examiner* — Christopher J Raab
(74) *Attorney, Agent, or Firm* — Prol Intellectual Property Law, PLLC; H. Kenneth Prol

(57) ABSTRACT

An information handling system operating a private individual data integration protection system comprising a processor receiving a query, submitted electronically, involving a request about private individual data and parsing elements the query, the processor correlating the query with private individual data manipulated within a business integration process modeled and deployed with a business integration application management system identifying data set field names via metadata and labels from the modeled business integration process matching private individual data identified in the query as being manipulated from a source input dataset to a destination dataset by operation of the business integration process, and transmitting a responsive report on the private individual data matching the received query indicating manipulation of the matching private individual data during the executed business integration process.

20 Claims, 9 Drawing Sheets

(56) References Cited

U.S. PATENT DOCUMENTS

| | | | |
|---|---|---|---|
| 2016/0149862 A1* | 5/2016 | Kilgallon | H04L 63/0245 |
| | | | 726/11 |
| 2021/0097069 A1* | 4/2021 | Schwartz | G06Q 10/08 |
| 2021/0099461 A1* | 4/2021 | Schwartz | G06F 21/62 |
| 2021/0234884 A1* | 7/2021 | Brown | H04L 67/1097 |

* cited by examiner

Select a Process

Attach Contact to Vendor

| Category | Data model fieldname | Shape | Operation Name | Type | Country | Process |
|---|---|---|---|---|---|---|
| National | Social_Security_Number | Start | Application A Vendor Lookup | Application A | Chile, United States | Attach Contact to Vendor |
| National | Title | Connector | Application B Vendor Store | Application B | Chile, United States | Attach Contact to Vendor |
| Personal | Vendor/ nullFieldList/ name | Connector | Application A Vendor Lookup | Application A | Chile, United States | Attach Contact to Vendor |
| Security | Vendor/ subscriptionsList/ lastModifiedDate | Connector | Application A Vendor Lookup | Application A | Chile, United States | Attach Contact to Vendor |
| Sensitive | | Connector | Application A Vendor Lookup | Application A | Chile, United States | Attach Contact to Vendor |
| Health | | Connector | Application A Vendor Lookup | Application A | Chile, United States | Attach Contact to Vendor |
| Financial | Vendor/ taxIDNumber | Connector | Application A Vendor Lookup | Application A | Chile, United States | Attach Contact to Vendor |

FIG. 5

SYSTEM AND METHOD OF INTELLIGENT DETECTION OF DATA MODEL FIELDNAME LINEAGE AND CONTEXT OF PRIVATE INDIVIDUAL DATA IN BUSINESS INTEGRATION PROCESSES

This application is a continuation of prior application Ser. No. 16/943,730, entitled "SYSTEM AND METHOD OF INTELLIGENT DETECTION OF DATA MODEL FIELDNAME LINEAGE AND CONTEXT OF PRIVATE INDIVIDUAL DATA IN BUSINESS INTEGRATION PROCESSES," filed on Jul. 30, 2020, which is a related case to U.S. Provisional Application No. 62/909,162, entitled "SYSTEM AND METHOD OF INTELLIGENT DETECTION OF DATA MODEL FIELDNAME LINEAGE WITH GEOGRAPHICAL LOCATION MOVEMENT CONTROL," filed on Oct. 1, 2019, which is a assigned to the current assignee hereof and is incorporated by reference in its entirety.

FIELD OF THE DISCLOSURE

The present disclosure relates generally to a system and method for deploying and executing customized data integration processes. More specifically, the present disclosure relates to tracking of data model field values likely to include sensitive personal information or private individual data as they are manipulated during a customized data integration process and providing a report to a private individual data owner that requests information as to how, when, and why their private individual data was manipulated.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a PC (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 5 is a graphical user interface for describing data model field values labeled as private individual data according to an embodiment of the present disclosure;

The use of the same reference symbols in different drawings may indicate similar or identical items.

DETAILED DESCRIPTION

Figure 1:
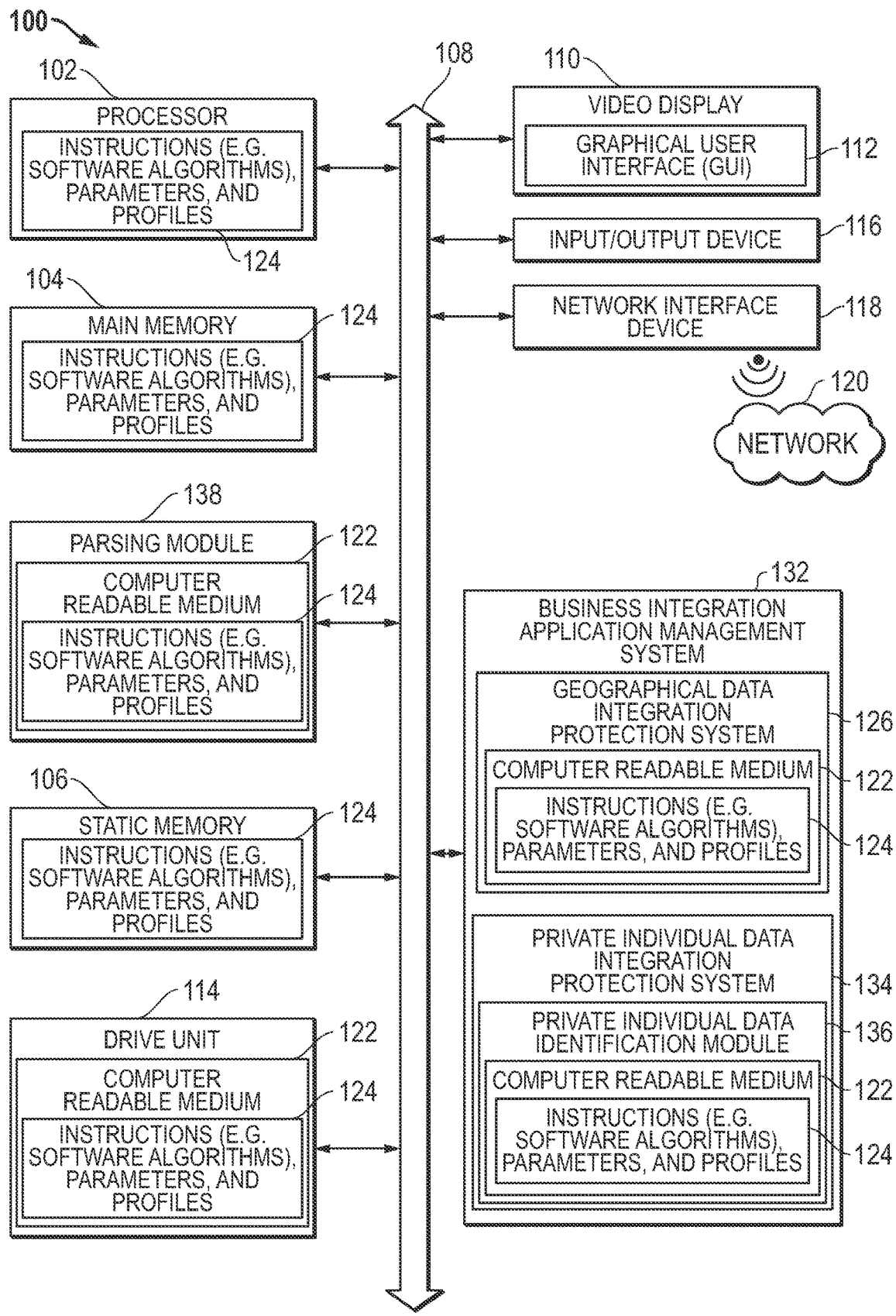
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present-day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, data model field values may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart®, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. through custom coding. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a data or business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a GUI. A modeled data integration process flow (aka: a business integration process flow or business integration process) in embodiments of the present disclosure may model actions taken on data elements pursuant to executable code instructions without displaying the code instructions themselves. In such a way, the GUI may allow a user to understand the high-level summary of what executable code instructions achieve, without having to read or understand the code instructions themselves. Similarly, by allowing a user to insert visual elements representing portions of an integration process into the modeled data integration process flow displayed on the GUI, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated by an integration application management system. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high-level knowledge of computer science. Such open-standard, human-readable, machine-executable file formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions have also streamlined the methods of communication between various software components. An API may operate to communicate with a backend application to identify an action to be taken on a dataset that the backend application manages, or which is being transmitted for management to the backend application. Such an action and convention for identifying the dataset or its location may vary among APIs and their backend applications. For example, datasets may be modeled according to user-supplied definitions. Each dataset may contain a user-defined data model fieldname, which may describe a type of information. Each user-defined data model fieldname may be associated with a data model field value. In other words, datasets may be modeled using a fieldname:value pairing. For example, a data model for a private individual data owner named John Smith may include a first data model fieldname "f_name" paired with a first data model field value "John," and a second data model fieldname "l_name" paired with a second data model field value "Smith." This utilizes the private individual data owners private individual data (i.e., the private individual data owner's name) in the field. A user in an embodiment may define any number of such data model fieldname/value pairs to describe a private individual data owner who is also the private individual data owner. Other example data model fieldnames in example embodiments may include "dob" to describe date of birth, "ssn" to describe social security number, "phone" to describe a phone number, or "hair," "race," and "reward."

In embodiments described herein, multiple APIs or backend applications accessed via a single integration process may operate according to differing coding languages, data model structures, data model field naming conventions or standards. Different coding languages may use different ways of describing routines, data structures, object classes, variables, or remote calls that may be invoked and/or handled during business integration processes that involve data model field values managed by the backend applications such APIs serve. Thus, a single data model field value may be described in a single integration process using a plurality of data model fieldnames, each adhering to the naming conventions set by the APIs, applications, enterprises, or trading partners through or among which the data model field value is programmed to integrate.

A user interacting with such an API for a backend application may identify such data model field values based on a description that may or may not include the actual data model fieldname of the data model field value. In some circumstances, a data model field value may be identified through a search mechanism, or through navigation through a variety of menus, for example. The code sets incorporating the actual data model fieldname for the data model field value may be automatically generating based on this user interaction with an API. In other embodiments, the data model field value may be identified in a similar way through interaction with the visual integration process flow user interface described herein. For example, the user may create two or more connector visual elements, with each connector element representing a process taken by a different application (e.g., Salesforce®, or NetSuite®). Because each of such connector elements may describe actions taken by a different application, and different applications may adhere to differing code languages, each of a plurality of code sets generated based on these user-generated connector visual elements may be written in a different code set, and may identify data model field values using different naming conventions, or storage structures. Thus, the code instructions for retrieving a given data model field value from a first application may describe that data model field value using a completely different data model fieldname than the code instructions for transmitting the same data model field value to a second application.

In embodiments described herein, a runtime engine may be created for execution of each of these code instructions written based on the user-modeled business integration process. The runtime engine, and all associated code instructions or code sets may be transmitted to an end user for execution at the user's computing device, or enterprise system, and potentially, behind the user's firewall. Because the user does not write the code instructions executed by the runtime engine, the user may not know the locations of servers through which the data to be integrated may pass during execution of the runtime engine, or the ways in which data model field values may be transformed (e.g., given a different data model fieldname) therein. As described above, the data model field values integrated during execution may pass through any number of servers, which may be located in various locations around the world. Further, the contents of these data model field values may include sensitive information (e.g., personal, secure information, sometimes referred to as personal identity information (PII)), which may not be readily apparent based on the metadata associated with the data model field values, or the data model fieldnames given to the data model field values by various applications involved in the integration process. A method is needed to identify, label, and track the ways in which such sensitive information is handled throughout execution of the integration process modeled by the user.

Security of personal information has become an increasing concern of governments and regulatory bodies throughout the world during the 21$^{st}$ century. These government and regulatory bodies have enacted or will enact a number of regulations related to the manipulation of this personal data or information. As an example, the European Union (EU) has recently enacted the General Data Protection Regulation (GDPR), which dictates requirements for processing of personal data of EU individuals, regardless of the geographical location of such processing. In short, enterprises doing business within the EU may be required to adhere to the GDPR, or face stiff fines or penalties. The GDPR contains several provisions requiring controllers of personal data (e.g., enterprises engaged in data integration processes) to place an appropriate technical and organization measures to implement data protection principles. Further, upon request of an EU citizen whose personal data has been included within an integration process, an adherent to the GDPR (e.g., entity performing data integration processes) must provide adequate explanation of the ways in which such personal data has been manipulated or transferred.

One way for an enterprise system executing data integration processes to protect against infringement involves tracking the content of data model field values being integrated, and the ways in which such data is being manipulated. For example, an ability to identify sensitive information and apply added security measures to integration processes involving such sensitive information may lessen the risk of infringement. In embodiments described herein, code instructions may be searched for one or more integration processes to identify data model field values accessed, copied, transferred, or otherwise manipulated therein that may contain sensitive information. Upon identification of a data model field value meeting preset search terms designed to identify sensitive information, the identified data model field value may be labeled as sensitive using one or more of a plurality of labels. Additionally, upon labeling the identified data model field value as sensitive, the specific private individual data owner associated with that private individual data is also identified. In a specific embodiment, an email associated with this specific private individual data owner may be identified for later identification and reporting to that specific private individual data owner. In these embodiments, the identified data model field value marked as sensitive as well as the data itself may be matched later to the private individual data owner upon request and a report may be sent to the private individual data owner at the email address associated with the private individual data. In the present specification and the appended claims, the term "private individual data owner" is defined as a person or entity whose data is stored, touched, read, written, or otherwise manipulated in any way within or at any point of the business process integration created and executed by the user. It may be a customer, an employee, a supplier, or another person with some participation in activity managed by a modeled business integration process. Thus, a private individual data owner is differentiated from a user in that the user has created the business process integration that manipulates the private individual data owner's or a plurality of private individual data owners' data. The systems and methods described herein allow for any private individual data owner to ask for or automatically receive a report as to how their private individual data has been manipulated and in what context or for what reason. This is done so as to satisfy any geographical regulations where the private individual data owners' data is manipulated such as GDPR.

Sensitive information (aka: private individual data) in some embodiments may receive a label identifying a data model field value as falling within one of a plurality of types of private individual data, including personal data, sensitive data, security data, health data, financial data, or national data. Individual data model field values may be labeled as one of these categories based on a description stored in metadata (e.g., documents marked confidential), or within the data model fieldname for the data (e.g., data model field value having a data model fieldname that includes search terms such as "FirstName," or "SSN" for Social Security Number). Thus, searching code instructions including data model fieldnames and metadata of data model field values accessed, copied, transferred, or otherwise manipulated throughout an integration process may assist enterprises in determining where added security measures may be needed.

Similar methods may also assist in deterring or lessening potential fines if an infringement should occur. Failure to comply with the GDPR, for example, may result in hefty fines. The level of fine levied against a non-compliant entity is determined according to a variety of factors, that include the extent of the infringement (e.g., number of people affected and damage caused thereto), mitigating acts taken by the non-compliant entity following infringement, preventative measures taken by the non-compliant entity prior to the infringement, what types of data were impacted by the infringement, and whether the non-compliant entity promptly notified those who were affected by the infringement, among others. In the unfortunate event of an infringement, enterprises executing data integration processes may at least decrease the amount of the resultant penalties by providing detailed metrics describing data affected by each integration process, individuals whose information was incorporated within such data, and the ways in which such data was accessed, copied, transferred, or otherwise manipulated in an infringing integration process. Such detailed information tracked and generated with private individual data integration protection system of embodiments of the present disclosure may indicate preventative and mitigating measures were taken, and may assist in notification of individuals impacted. Further, providing a tangible number of individuals impacted may avoid an assumption of a much higher number of victims and damages caused thereto.

In addition to labeling a data model field value as falling within one of the preset sensitive categories described above, the geographical data integration protection system in embodiments described herein may also track the movement of such a data model field value throughout the integration process, to assist with the type or reporting required by the GDPR. As described herein, because multiple steps within the integration process may be executed using different coding languages, the code instructions for retrieving a given data model field value from a first application/location/enterprise may describe that data model field value using a completely different data model fieldname than the code instructions for transmitting the same data model field value to a second application/location/enterprise. In embodiments described herein, each data model fieldname given to a given data model field value throughout an integration process may be mapped, identifying which of these data model fieldnames was applied at each application/location/enterprise involved in the integration process, and the manipulation or action performed by each of these applications/locations/enterprises during the integration process. This manipulation of each of the private individual data owners' data may be tracked and associated with each of the private individual data owners' identification and contact information by the private individual data integration protection system of embodiments of the present disclosure in an embodiment. Further, the private individual data integration protection system of embodiments of the present disclosure may also assess the context of manipulation of the private individual data by one or more business integration processes.

Users of the GUI describing the flow of the integration process in embodiments described herein may use map elements to associate a first data model fieldname for a data model field value being retrieved from a first application or source with a second data model fieldname under which that data model field value will be stored at a second application or destination. Because a single integration process may transmit data model field values between or among several sources and destinations, a process flow may include several of these mapping elements, sometimes placed in series with one another. This may result in a single data model field value receiving several different data model fieldnames as it moves through a potentially large number of physical locations throughout the integration process. In embodiments described herein, information supplied via these mapping elements may be used to generate and display a fieldname lineage map that illustrates, in chronological order with respect to the integration process, the ways in which the data model fieldname used to describe a single data model field value changes throughout that process, and the locations at which such changes occur.

As described herein, security of personal information has become an increasing concern during the 21$^{st}$ century, resulting in governmental regulations such as the GDPR, requiring controllers of personal data to implement appropriate data protection principles, and provide adequate explanation of the ways in which such personal data has been manipulated or transferred. Thus, enterprises executing an integration process may need to track the manipulation and context of manipulation or transfer or private individual data as well as track the physical locations where data is stored or transferred throughout such an integration process, and to report the ways in which such data was manipulated at each of these steps. In some embodiments a system may be provided to inhibit transfer of data to physical locations the user has identified as barred, or off-limits. For example, an enterprise may wish to avoid the transfer of data including intellectual property to countries in which patents on such subject matter have yet to be filed. As another example, enterprises may view security of servers in certain geographical location to be questionable (e.g., in countries in which data protection regulations are not applied or enforced). In such scenarios, a method of notifying the user of a potential risk, or automatically inhibiting movement of certain data through these barred geographic locations may be conducted by a geographical data integration protection system.

The geographical data integration protection system in embodiments described herein addresses these issues by tracing the physical locations through which data moves during a first execution of an integration process, reporting the movement of potentially private individual data during such a process, and in some cases, automatically adjusting the integration process to avoid transfer of private individual data through barred locations. In embodiments described herein, a user within an enterprise system or network may execute an integration process to transfer a data model field value between a source application or location and a destination application or location. As the data model field value travels between the source and destination, metadata identifying the servers (e.g., by URL, hostname, IP address, ports, databases, etc.) may be appended to the data model field value. The geographical data integration protection system in embodiments described herein may analyze such metadata using a geolocation service to identify the geographic location of each identified server through which the data model field value travelled as it moved from the source to the destination. Further, the geographical data integration protection system may update the fieldname lineage map to associate each manipulation of the data model field value made throughout the integration process with the identified geographic location at which each manipulation occurred. In such a way, the geographical data integration protection system in embodiments may provide a lineage of each physical location at which a given data model field value is stored, transmitted, copied, or otherwise manipulated during an integration process.

Still further, the geographic data may also be used to determine which, of a plurality of governmental regulations, apply to the manipulation of private individual data owners' private individual data. This data may be used to address a query from a specific private individual data owner as to how their private individual data is being manipulated through the business process integration. When the integration application management system receives this query, the private individual data that was tracked by the private individual data integration protection system and may provide, as output, a report regarding how the private individual data owner's data was manipulated and when. The geographical data may provide the private individual data integration protection system with a description of the type of data that must be included within the report based on the applicable governmental regulations such as GDPR. Where a governmental regulation does not require certain data to be included in the report, this data may be withheld from that report. Alternatively, in order to be more transparent, the report may include most if not all of the data that describes how the private individual data owner's data was manipulated.

In embodiments described herein, the private individual data integration protection system may further display such information, in a searchable format, for easy generation of reports complying with GDPR requirements for a user or developer of the business process integration. For example, the private individual data integration protection system in embodiments may employ a GUI to display descriptive information for one or more data model field values labeled as "sensitive." Such a visual display may allow a user to view all data model field values labeled under any of the sensitive categories described herein occurring within a single integration process, or across a plurality of integration processes. Users may also display descriptive information of private individual data model field values by specific data model fieldname of the data model field value, the specific label applied to the data model field value (e.g., personal, financial, health, security, national, sensitive), or context of manipulation. The user may also display the physical location of the servers that received or temporarily stored such data model field values during the integration process via the geographical data integration protection system. The private individual data integration protection system may also allow users to display descriptive information about such data model field values according to the shape of the visual connector associated with the code set in which the data model field value was identified as sensitive, the name of the application or enterprise executing that code set, or the way in which such a code set operated to manipulate that data model field value. Once the user locates a data model field value of interest using such a GUI in embodiments described herein, the private individual data integration protection system may export the code instructions in which the data model field value was identified, in one of a plurality of different code languages, as selected by the user, via the GUI. In such a way, the private individual data integration protection system in embodiments described herein may track which data model field values containing personal information were accessed, transferred, or otherwise manipulated during an integration process and how, as well as the applications/locations/enterprises at which such access or manipulation occurred.

The integration application management system may interface with a private individual data identification module and a private individual data integration protection system to match the data model field values of interest that describe private individual data manipulation with a query or request received from a private individual data owner. In an embodiment, a parsing module may be executed by a processor to parse the private individual data owner's query. The parsing module may be an artificial intelligence module to interpret query data, including a private individual data owner identity entries, and match those via a machine learning classifier with data fields, data fieldnames, integrations, shapes, and other components of the business integration processes that may implicate this inquirer's private individual data. By parsing the query, the parsing module may provide the private individual data integration protection system with specific words or phrases that indicate the private individual data owner is requesting data related to how their private individual data has been manipulated and, in some instances, when that private individual data was manipulated. This allows the private individual data associated with every private individual data owner to be tracked throughout and during the execution of the business process integration so that a subsequent query from any individual query may be answered with as complete information as possible.

As described herein, in some circumstances, a system is needed to inhibit transfer of data to physical locations the user has identified as barred, or off-limits. The geographical data integration protection system in embodiments described herein may address this issue by alerting the user to a potential risk prior to subsequent executions of an integration process, or by inhibiting such an execution, either partially or wholly. For example, in some embodiments described herein, the geographical data integration protection system may determine that a data model field value has passed through a server in a user-defined barred geographic location during a previous execution of an integration process. In such a scenario, the geographical data integration protection system in some embodiments may disable automatic or scheduled future executions of that integration process, as a whole. In some embodiments, the geographical data integration protection system may reduce the amount of data that is presented to a private individual data owner by limiting the transmission of private individual data owner private individual data to other geographical locations so that certain requirements to report such transmission are not necessary. However, it is understood that, in some circumstances, preventing the transmission of private individual data owner's private individual data may not be accomplishable the certain corporations for which the business process integration was built for must operate in separate geographical areas. In these embodiments, the report presented to the private individual data owner upon request via the query may so indicate the modification of the private individual data and its transmission to specific geographic areas along with reasons why that transmission to those geographical areas was necessary.

In other embodiments, the geographical data integration protection system may update or edit the flow diagram for the integration process to terminate only the portion of the integration process that allows for passage of the private individual data model field value through the barred location. In such embodiments, the geographical data integration protection system may then transmit the updated integration process for execution at the enterprise system, according to an automated execution scheduler. In such a way, the geographical data integration protection system may automatically inhibit transfer of private individual data model field values through geographic locations barred by a user in an embodiment.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the geographical data integration protection system 126, private individual data integration protection system 134, private individual data identification module 136, parsing module 138, or the business integration application management system 132 that may operate on servers or systems, remote data centers, or on-box in individual client information handling systems such as a local display device, or a remote display device, according to various embodiments herein. In some embodiments, it is understood any or all portions of code 124 for the geographical data integration protection system 126, parsing module 138, private individual data identification module 136, private individual data integration protection system 134, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the geographical data integration protection system 126, parsing module 138, private individual data identification module 136, private individual data integration protection system 134, or the integration application management system 132 (volatile (e.g. random-access memory, etc.), nonvolatile (read-only memory, flash memory etc.) or any combination thereof). Additional components of the information handling system 100 can include one or more storage devices such as static memory 106, drive unit 114. The information handling system 100 can also include one or more buses 108 operable to transmit communications between the various hardware components such as any combination of various input and output (I/O) devices 116. Portions of an information handling system may themselves be considered information handling systems.

As shown, the information handling system 100 may further include a video display 110, such as a liquid crystal display (LCD), an organic light emitting diode (OLED), a flat panel display, a solid-state display, or other display device. Additionally, the information handling system 100 may include a control I/O device 116, such as an alpha numeric control device, a keyboard, a mouse, touchpad, fingerprint scanner, retinal scanner, face recognition device, voice recognition device, or gesture or touch screen input.

The information handling system 100 may further include a graphical user interface (GUI) 112. The GUI 112 in an embodiment may provide a visual designer environment permitting a user to define process flows between applications/systems, such as between trading partner and enterprise systems, and to model a customized business integration process. The GUI 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the GUI 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

In some embodiments, the GUI 112 may also allow a user or a private individual data owner or other inquiry to provide one or more search terms to the private individual data integration protection system that may be used to identify data model field values affected by one or more integration processes that are likely to include sensitive information. A user or other inquiry in such an embodiment may interact with such a GUI 112 to include or exclude terms used by the geographical data integration protection system 124, the private individual data identification module 136, or the private individual data integration protection system 134 to search code instructions executed during one or more integration processes for potentially private individual data model field values manipulated therein. In yet another embodiment, a user may employ the GUI 112 to search and view information describing data model field values identified in such a manner to be potentially sensitive.

The information handling system 100 can represent a server device whose resources can be shared by multiple client devices, or it can represent an individual client device, such as a desktop PC, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer-based functions disclosed herein. For example, information handling system 100 includes instruction 124 for an operating system (OS) such as a Windows® OS, Android® OS or other OS to control execution of instructions 124 for one or more application programs, and instructions 124 for Basic Input/Output System and Firmware (BIOS/FW) code. BIOS/FW code functions to initialize information handling system 100 on power up, to launch an operating system, and to manage input and output interactions between the operating system and the other elements of information handling system 100. In a particular embodiment, BIOS/FW code resides in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or an API adhering to a known open source specification may enable application programs 124 to interact or integrate operations with one another.

In an example of the present disclosure, instructions 124 may execute software for identifying, labeling, tracking, and reporting information describing data model field values accessed, transferred, copied, or otherwise manipulated during an integration process, for compliance with governmental regulations. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114 may include a computer-readable medium 122 such as a magnetic disk, or a solid-state disk in an example embodiment. The computer-readable medium of the memory and storage devices 104, 106, 114, 132 and 126 may store one or more sets of instructions 124, such as software code corresponding to systems 126, 132, 134 and other modules 136 and 38 as described in embodiments of the present disclosure.

The disk drive unit 114, static memory 106, and computer readable medium 122 of the integration application management system 132, the private individual data integration protection system 134, the private individual data identification module 136, the parsing module 138, or the geographical data integration protection system 126 also contain space for data storage such as an information handling system for managing types and locations of executions of customized integration processes in endpoint storage locations. Connector code sets, and trading partner code sets may also be stored in part in the disk drive unit 114, static memory 106, or computer readable medium 122 integration application management system 132, the private individual data integration protection system 134, the private individual data identification module 136, the parsing module 138, or the geographical data integration protection system 126 in an embodiment. In other embodiments, data profile code sets, and run-time engines may also be stored in part or in full in the disk drive unit 114, static memory 106, or computer readable medium 122 for the geographical data integration protection system 126, the parsing module 138, the private individual data identification module 136, the private individual data integration protection system 134, or the integration application management system 132. Further, the instructions 124 of the integration application management system 132, the private individual data integration protection system 134, the private individual data identification module 136, the parsing module 138, or the geographical data integration protection system 126 may embody one or more of the methods or logic as described herein.

In a particular embodiment, the instructions, parameters, and profiles 124, and the geographical data integration protection system 126, parsing module 138, private individual data identification module 136, private individual data integration protection system 134, or the integration application management system 132 may reside completely, or at least partially, within the main memory 104, the static memory 106, disk drive 114, and/or within the processor 102 during execution by the information handling system 100.

Network interface device (NIC) 118 represents a NIC disposed within information handling system 100, on a main circuit board of the information handling system, integrated onto another component such as processor 102, in another suitable location, or a combination thereof. The NIC 118 can include another information handling system, a data storage system, another network, a grid management system, another suitable resource, or a combination thereof.

The geographical data integration protection system 126, the parsing module 138, the private individual data identification module 136, the private individual data integration protection system 134, and the integration application management system 132 may also contain or utilize any computer readable medium 122 of the information handling system 100. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include integration application management system 132, the private individual data integration protection system 134, the private individual data identification module 136, the parsing module 138, or the geographical data integration protection system 126. The integration application management system 132, the private individual data integration protection system 134, the private individual data identification module 136, the parsing module 138, or the geographical data integration protection system 126 may be operably connected to the bus 108. In an embodiment, the private individual data integration protection system 134 may identify data set field names labeled as private individual data as being manipulated by the source storage location and the destination storage location. In an embodiment, the private individual data identification module 136 may concurrently identify the private individual data that is manipulated and associate that private individual data with a specific private individual data owner who owns that private individual data. Still further the parsing module 138, with the execution of the NIC 118, may receive a query from the private individual data owner requesting information regarding the use of their private individual data, parse the query, and provide to the private individual data identification module 136 with a description of what information the private individual data owner is asking for. By parsing the query, the parsing module 238 may identify specific words or phrases that indicate the private individual data owner is requesting data related to how their private individual data has been manipulated and, in some instances, when that private individual data was manipulated. The private individual data identification module 136 may then generate a report from the private individual data discovered to be associated with that private individual data owner. In an embodiment, the report may describe the type of private individual data manipulated within the data integration process, where the private individual data was read, written or copied to, and the reasons why these manipulations of the private individual data owner's private individual data was executed. The private individual data integration protection system 134, the private individual data identification module 136, and the parsing module 138 are discussed in greater detail herein.

Further, in the embodiments described herein, the geographical data integration protection system 126 of the business integration application management system 132 may determine if and identify which private individual data owner's private individual data has been manipulated at any server within a geographic location. In some embodiments, these geographic locations may be user-defined barred geographic location and the geographical data integration protection system 126 may prevent the transmission of this data to those geographic location. The geographical data integration protection system 126 and the integration application management system 132 are discussed in greater detail herein.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device or processor, such as an Intel® Core class processor, AMD® processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the geographical data integration protection system 126, the parsing module 138, the private individual data identification module 136, the private individual data integration protection system 134, and the integration application management system 132 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Figure 2:
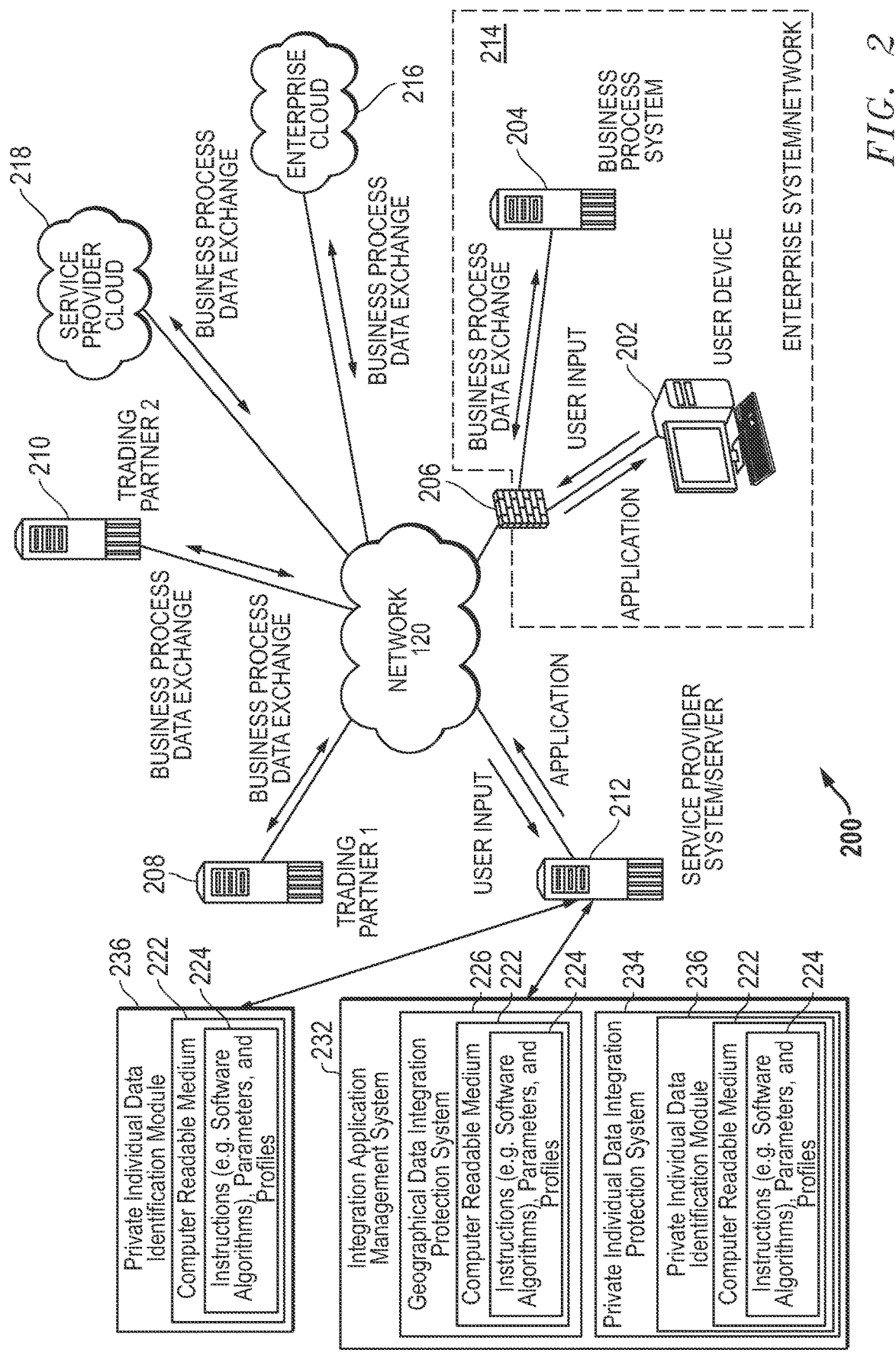
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include computing hardware of a type typically found in client/server computing environments. More specifically, the integration network 200 in an embodiment may include a user/client device 202, such as a desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks®, SalesForce's® Customer Relationship Management (CRM) Platform, Oracle's® Netsuite Enterprise Resource Planning (ERP) Platform, Infor's® Warehouse Management Software (WMS) Application, or many other types of databases.

In an embodiment, the integration network 200 may further include trading partners 208 and 210 operating hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via file transfer protocol (FTP) or simple file transfer protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user of the integration application management system to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a data model field value may be transferred, according to embodiments described herein, may be located remotely from the enterprise system 214, at a service provider cloud location 218, or an enterprise cloud location 216. In some embodiments, a single data integration process may involve movement of data model field values among several different entities, in series. For example, a data model field value may travel via network 120 from the enterprise system 214, to enterprise cloud 216, then cloud service provider 218, and ultimately to trading partner 208. A data model field value may move, undergoing temporary or permanent storage or other manipulations, through potentially hundreds of such different physical servers, at potentially hundreds of geographic locations within a single integration process in some embodiments. This data model field value may include, and be flagged as such, private individual data that is associated with a specific private individual data owner due to the private individual data describing or tied to that private individual data owner. For the purposes of the present specification, the private individual data may include any of a personal data, sensitive data, security data, health data, financial data, or national data among other types of private individual data.

A user of an integration process-modeling user interface of the integration application management system 232 in an embodiment may model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element of the integration process-modeling user interface of the integration application management system 232 that the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the connector integration elements chosen by the user or indicated by the integration application management system 232. The run-time engine may then execute the subsets of code instructions in the order defined by the modeled flow of the connector integration elements given in the integration process flow diagram. In some embodiments, the integration application management system 232 may define the order in which such subsets of code instructions are executed by the runtime engine without creation of or reference to a visual integration process flow diagram. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce® CRM account and a cloud-based Oracle® Netsuite account. In such an embodiment, the enterprise system 214 may initiate business process data exchanges between itself, the SalesForce® CRM service provider and the Oracle® Netsuite service provider.

In some embodiments, the runtime engine may be preset to automatically execute at specific times according to a user-defined schedule. In another aspect of such embodiments, a portion of the integration application management system 232 operating at the enterprise system network 214 may check or retrieve updates made to the integration process at the service provider system/server 212 prior to each scheduled execution.

Following execution of an integration process involving transfer of private individual data between the enterprise system/network 214 and a remotely located source or destination (e.g., first trading partner 208, second trading partner 210, cloud service provider 218, or enterprise cloud 216), a geographical data integration protection system 226 operating at least partially at the service provider system/server 212 or the enterprise system/network 214 may retrieve metadata appended to such private individual data at the destination location. When the geographical data integration protection system 226 in such an embodiment determines the data model field value traveled through a user-defined barred geographic location during a previous execution of the integration process, the geographical data integration protection system 226 may alter the integration process flow to inhibit repeated movement of the data model field value through such barred geographic location, or seize execution by terminating a portion of the integration process prior to such movement in some embodiments. Additionally, or alternatively, the geographical data integration protection system 226 may also determine that the data model field value associated with the private individual data traveled through a specific geographic location during a previous execution of the integration process, the geographical data integration protection system 226 may provide such metadata to the private individual data integration protection system 234 along with any private individual data owner identification data associated with that private individual data. As such, the geographical data integration protection system 226 may coordinate with the private individual data integration protection system 234 to identify the manipulation of any private individual data throughout the data integration process.

In some embodiments, the geographical data integration protection system 226 may reroute the movement of such private individual data within the integration process to other servers, not located within the barred geographic location, but allow the integration process to execute fully. For example, an initial execution of an integration process may route a private individual data model field value through the cloud service provider 218 to reach the first trading partner 208. If the geographical data integration protection system 226 determines cloud service provider 218 servers are located within a user-defined barred geographic location, the geographical data integration protection system 226 in some embodiments may edit the integration process to reroute the private individual data through the enterprise cloud 216, rather than the cloud service provider 218. The updated integration process may then be transmitted to the enterprise system 214 for execution prior to any future executions of the integration process according to the automatic scheduler.

As mentioned, the service provider system/server 212 may include the integration management system 232 as well as any module or system available to the user to visually model a data or business integration process via a flowcharting process, using only a web browser interface similar to that described in connection with FIG. 1. Additionally, the service provider system/server 212 includes a private individual data integration protection system 234 that includes a private individual data identification module 236. The private individual data integration protection system 234 provides a level of protection of the private individual data associated with and/or provided by each private individual data owner associated with the data integration process and its operation. This data may be provided to, for example, any of the trading partners 208 and 210 or the enterprise system/network 214 by any private individual data owner in order to facilitate any number of business transactions for example. This private individual data owner-provided private individual data may include personal data, sensitive data, security data, health data, financial data, or national data, among other types of data. The personal data may include the private individual data owner's name, address, phone number, date of birth, email address, and country, state, city and street of residence or business in some embodiments. The security data may include a username, a password, and an IP address in some embodiments. The health data may include medical records data, personal health info (PHI), and WHO ICD codes in some embodiments. The financial data may include bank account numbers, credit card numbers, and routing numbers in some embodiments. The nation data may include passport data, driving license data, social security number, and tax ID in some embodiments. The sensitive data may include sexual preference data, political views data, race data, gender data, and religious views in some embodiments. As can be appreciated this data may be extremely personal to the private individual data owner and private individual data owner may provide this data for the sole purpose of effectuating a service or purchasing a product over the internet, for example. As such this data must be protected in order to provide a level of comfort and assurance to the private individual data owner when the private individual data owner provides this data to these corporations and trading partners. As such, some government and regulatory bodies have enacted or will enact a number of regulations related to the manipulation of this personal data or information such as the GDPR described herein. These regulations provide for automatic reporting or reporting upon request to the private individual data owner as to how, when, and why their private individual data is modified (read, written, copied, augmented, etc.).

During operation, the service provider system/server 212 may receive a query from a private individual data owner at a NIC (not shown). The NIC may forward the query onto a parsing module (such as 138 of FIG. 1) that works with the private individual data integration protection system 234 in some embodiments. The query may be received at, for example, a private individual data owner accessible help page associated with an application of the data integration process. The query may include a request by the private individual data owner to access data descriptive of how, when, and why their private individual data was manipulated during execution of the data integration process. The parsing module may parse the text of the query via an artificial intelligence syntax parsing system and, in some embodiments, utilize a machine learning classifier or other deep learning supervised learning system for providing the parsed request data to the private individual data integration protection system 234 to identify data set field names labeled as private individual data and to particularize a search for such private individual data corresponding to the identified private individual data owner that is the subject of the inquiry.

As described herein, a user interacting with an API of a data integration process for a backend application may identify data model field values based on a description that may or may not include the actual data model fieldname of the data model field value. In some circumstances, a data model field value may be identified through a search mechanism executed by the private individual data integration protection system 234 and private individual data identification module 236. Because each of such connector elements may describe actions taken by a different application and may identify specific data model field values where private individual data is to be manipulated, these data model field values may be identified by the execution, via a processor, of the private individual data identification module 236. This allows the data integration process to identify and report to the private individual data identification module 236 those data model field values where private individual data is to be modified.

Once the private individual data identification module 236 has identified those data model field values where private individual data may be modified according to the underlying computer executable program code, the private individual data integration protection system 234 may monitor for the transmission of private individual data at these data model field values. This monitoring may be conducted on a continual basis as the data integration process is executed.

Concurrently, the integration application management system 232 may execute the private individual data integration protection system 234 to compare any specific words or phrases parsed by the parsing module that had indicated the private individual data owner's request of data related to how, when, and why their private individual data has been manipulated and the identity of the private individual data owner. A machine learning classifier or other deep learning system may be utilized to determine classifications of fieldnames, labels, data entries, and other particularized information indicating sensitive information within one or more business integration processes managed by a service provider or an enterprise user. As such, a report may be issued by the integration application management system 232 using the private individual data integration protection system 234 to the user that provides data descriptive of how, why, and when, that private individual data owner's data was manipulated. This report may be presented to the private individual data owner in any level of granularity such that the report satisfies any governmental regulations within any geographical region that the private individual data owner's data was manipulated. It is anticipated that the private individual data owner's data may be have been manipulated within multiple geographical regions and, as such, multiple governmental regulations may be applicable when considering what information to present in the report to the private individual data owner.

By way of example, a data integration process may include a first database that stores an amount of private individual data for any number of private individual data owners. The data integration process may also include a second private individual data owner database which interfaces with the first database in order to obtain a specific private individual data owner's private individual data and process that data at, for example, a billing application. This manipulation of the private individual data owner's private individual data may have been conducted in order to update a billing address or other data related to the operation of the billing application. In this specific example, the integration application management system 232, via the NIC may receive a query from the private individual data owner requesting a report regarding how, where, and why their private individual data was manipulated. This query may be sent to the integration application management system 232 via a webpage containing a freeform space to request a report or a fixed form for the same. The webpage may be associated with the integration application management system 232 or any other components of the integration network 200 described herein.

Once the integration application management system 232 has received this query from the private individual data owner, the integration application management system 232 may pass the query to the parsing module to be parsed. The parsing may utilize artificial intelligence parsing to detect a plurality of words or phrases that indicate what type of data the private individual data owner is asking for as well as the identity of the private individual data owner. This parsed data, once determined, may be sent to the private individual data identification module 236 of the private individual data integration protection system 234. The private individual data identification module 236 then compares the identity of the private individual data owner and the parsed data with the individual data model field values that have been discovered by the private individual data identification module 236 as potentially manipulating private individual data. This may be a simple comparator that searches data for the one or more business integration processes involved or may utilize a machine learning system to classify and match the parsed query with aspects of the one or more business integration processes in various embodiments. This comparison results in the identification of the specific private individual data owner's data that is maintain on the first and second database, read at those databases, copied at those databases, and written to a database associated with the billing application to update the billing address of the private individual data owner according to an example embodiment.

At this point, the private individual data integration protection system 234 may receive the metadata descriptive of how, where, and why the private individual data owner's data was manipulated. The private individual data integration protection system 234 may then produce a report for the private individual data owner descriptive of this manipulation of their data in some embodiments. The report may provide the purpose of the manipulation: "your private individual data was processed for the purpose of updating your address in our company billing system." The report may provide a category assigned to manipulated data: "personal" (i.e., full name, address, phone number, date of birth, email and country, state, city, and street address). The report may also indicate the time the private individual data was manipulated: Feb. 27, 2020 at 7:41 am ET. The report may also include information regarding the geolocations of the manipulation of the data at any time during the execution of the data integration process by the geographical data integration protection system 226: "your private individual data was read from a database in the United Kingdom and updated at the billing application located in Germany). As such the report may be sent to the private individual data owner in order to fulfill governmental regulation requirements concerning the manipulation of the private individual data owner's data within the data integration process.

Figure 3A:
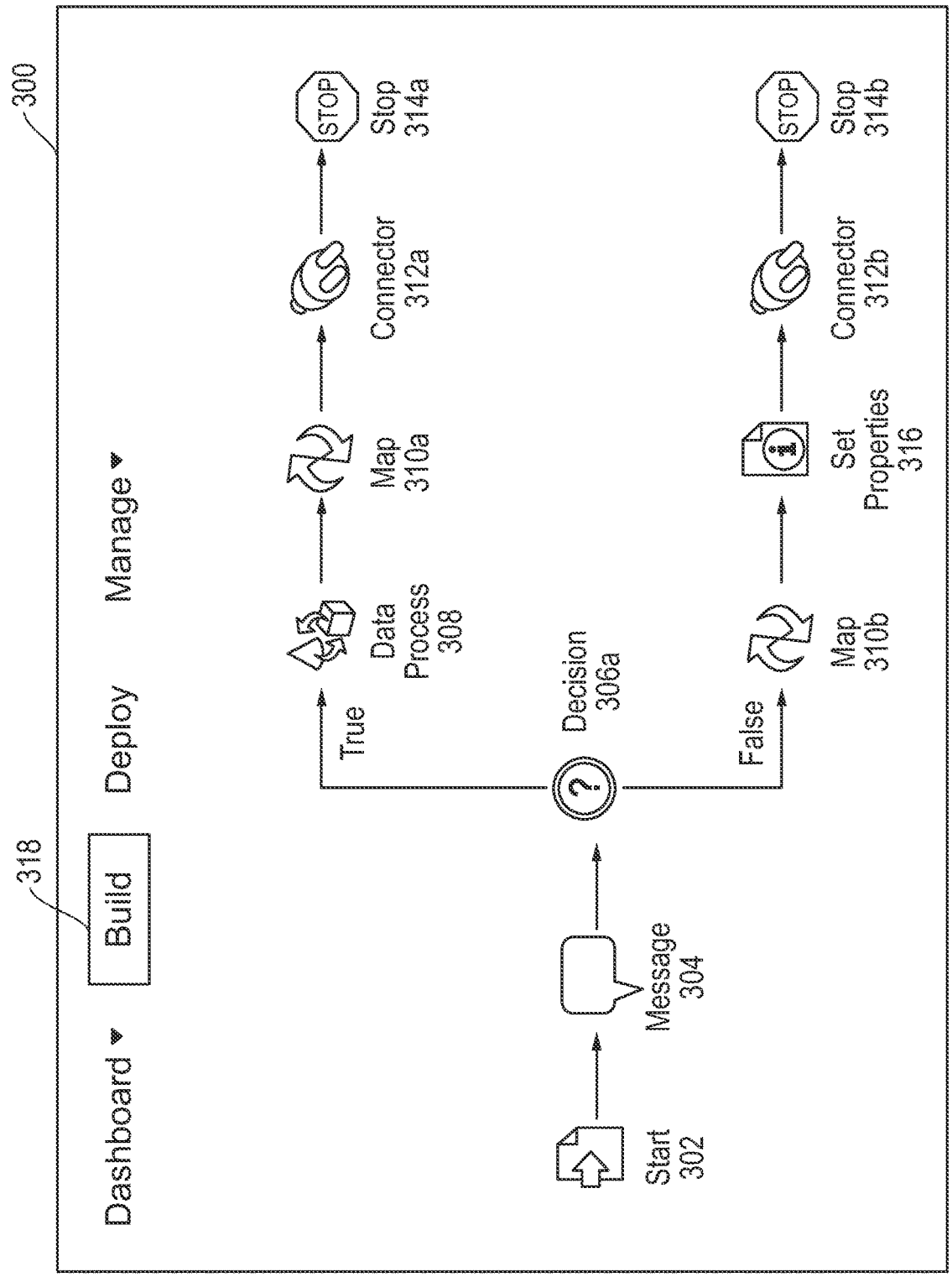
FIG. 3A is a graphical diagram illustrating a user-generated flow diagram of a data integration process according to an embodiment of the present disclosure.

FIG. 3A is a graphical diagram illustrating a user-generated flow diagram of an integration process for exchange of electronic data records according to an embodiment of the present disclosure. The flow diagram in an embodiment may be displayed within a portion of a graphical user interface 300 that allows the user to build the process flow, deploy the integration process modeled thereby, manage data model field values manipulated by such an integration process, and to view high-level metrics associated with execution of such an integration process. The user may build the process flow and view previously built process flow diagrams by selecting the "Build" tab 318 in an embodiment. A user may generate a flow diagram in an embodiment by providing a chronology of process-representing integration elements via the use of an integration process-modeling user interface. In some embodiments, the integration process-modeling user interface may take the form of a GUI. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user or the geographical data integration protection system to arrange them as appropriate to model a full integration process. For example, in an embodiment in which the integration process-modeling user interface is a GUI, the elements may include visual, drag-and-drop icons representing specific units of work (known as process components) required as part of the integration process. Such a process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow the geographical data integration protection system, the private individual data integration protection system, the private individual data identification module, or a user to choose from different actions the "connector" component may be capable of taking on the data as it enters that process step. Further the integration-process modeling user interface in an embodiment may allow the user to choose the data set or data element upon which the action will be taken. The action and data element the user chooses may be associated with a connector code set, via the integration application management system, which may be pre-defined and stored at a system provider's memory in an embodiment. The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram, or by the geographical data integration protection system in a non-visual format.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite® or SalesForce®, the user may create a database connector process component, associated with a pre-built connector code set that may be used with any database, then tailor the database connector process component to specifically access NetSuite® or SalesForce® by adding process component parameters associated with one of these applications. If the user uses this process component in several different integration processes, the user may wish to save this process component for later use by saving it as a NetSuite® or SalesForce® process component. In the future, if the user wishes to use this component, the user may simply select the NetSuite® or SalesForce® component, rather than repeating the process of tailoring a generic database connector process component with the specific parameters defined above.

As shown in FIG. 3A, such process-representing visual elements may include a start element 302, a message element 304, a map element 310a or 310b, a set properties element 316, a connector element 312a or 312b, and a stop element 314a or 314b. Other embodiments may also include a branch element, a decision element 306a, a data process element 308, or a process call element, for example. A connector element 312a or 312b, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 314a or 314b may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user or the geographical data integration protection system may use a connector element to define a connection (e.g., an application managing data upon which action is to be taken), and the action to be taken. A user may use a connector element to further define a location of such data, according to the language and storage structure understood by the application managing such data. In addition, the data to be accessed according to such a start element 302 may be identified by a data model fieldname given in a format that adheres to the code language and storage structure used by the application/location/enterprise at which such a data model field value may be accessed. Additionally, the user or the private individual data integration protection system may use a connector element to define or identify a connection (e.g., an application managing data upon which action is to be taken), and the action to be taken. A user may use a connector element to further define a location of such data, according to the language and storage structure understood by the application managing such data. In addition, the data to be accessed according to such a start element 302 may be identified by a data model fieldname given in a format that adheres to the code language and storage structure used by the application/location/enterprise at which such a data model field value may be accessed. In an embodiment, the data model fieldname associated with any connector my indicate to the private individual data integration protection system as to if, when, how, and why data associated with any specific private individual data owner is manipulated as described herein.

A map element 310a or 310b in an embodiment may associate a first data model fieldname for a data model field value being retrieved from a first application or source with a second data model fieldname under which that data model field value will be stored at a second application or destination. A user may also provide a "function" name that describes the purpose for changing the data model fieldnames of the data model field value in such a way. Because a single integration process may transmit data model field values between or among several sources and destinations, a process flow may include several of these mapping elements 310a and 310b, sometimes placed in series with one another. This may result in a single data model field value receiving several different data model fieldnames as it moves from various sources to various destinations throughout the data integration process.

A set properties element 316 in an embodiment may allow the user to set values identifying specific files. Set properties elements in an embodiment may associate a user-defined property with a user-defined parameter, similar to a key-value pair definition. For example, a user, the geographical data integration protection system, or the private individual data integration protection system in an embodiment may use a set properties element to set the property "data model fieldname" to a parameter "Private Individual Data," in order to identify a specific data model field value entitled "Private Individual Data." In some embodiments, this may invoke a call to an API controlling access to the application/location/enterprise managing such a data model field value to search for a data model field value having a data model fieldname that matches one or more of these descriptive phrases, rather than identifying a data model field value having the exact data model fieldname "Private Individual Data." For example, a user entering the value "Private Individual Data" in an embodiment may invoke a call to locate data model field values having data model fieldnames "Private Data," "Individual Data," "PrivateIndividualData," "PIdata," etc. by the private individual data integration protection system.

The code sets associated with such property and parameter fields in an embodiment may be written in any programming code language, so long as the code language in which the property is defined matches the code language in which the parameter is also defined. Similarly, the code sets associated with the connection location and action to be taken within a connector element may be written in any programming code language so long as they are consistent with one another. Thus, the process-representing elements in an embodiment may be programming language-agnostic. Using such process-representing elements in an embodiment, a user may model an end-to-end data integration process between multiple applications that each use different naming conventions and storage structures for storage of data model field values. As a result, a single data model field value accessed at the start element 302 and transmitted to second or third locations at the connector elements 312a and 312b in an embodiment may be identified at the start element 302 by the private individual data integration protection system with a completely different data model fieldname (e.g., "Social_Security_Number") than the data model fieldname (e.g., "Title") used to identify the exact same data model field value at the connector elements 312a and 312b.

If a user anticipates a modeled integration process may access, copy, transmit, or otherwise manipulate a data model field value likely to include sensitive information (e.g., personal information protected under the GDPR), the user may provide terms describing such data within a message element 304 in an embodiment. For example, a user may add a message element 304 to the visual flow process within the user interface, which may then prompt the user to provide one or more search terms used to identify potentially sensitive information, as described in greater detail herein. In embodiments described herein, the ways in which such given data model field value information is handled throughout the integration process modeled by the user may be identified, labeled, and tracked, despite the plurality of data model fieldnames used to identify such information throughout the process. This may also be used by the private individual data integration protection system when searching or tracking private individual data, its manipulation, and context of use in one or more business integration processes.

As described herein, the GDPR contains several provisions requiring controllers of private individual data (e.g., enterprises engaged in data integration processes) to place an appropriate technical and organization measures to implement data protection principles. The geographical data integration protection system in an embodiment may operate to identify sensitive information and apply added security measures to integration processes involving such sensitive information, to avoid the risk of infringing the GDPR. Additionally, the private individual data integration protection system with its private individual data identification module may operate to also identify the private individual data associated with each specific private individual data owner and track the manipulation of that private individual data throughout the data integration process as described herein. Thus, along with knowing which geographical location the private individual data is manipulated at, the private individual data integration protection system allows for a report to be created that defines also the purpose of the manipulation, the category of data that the manipulated private individual data, stored locations of the private individual data, locations where any private individual data was copied to, the data and time of any manipulation of the private individual data, among other metrics.

In embodiments described herein, code instructions may be searched for one or more integration processes to identify data model field values accessed, copied, transferred, or otherwise manipulated therein that may contain private individual data. Upon identification of a data model field value associated with a data model fieldname meeting preset search terms provided by the user within the message element 304 and designed to identify private individual data, the identified data model field value may be labeled as private individual data using one or more of a plurality of labels. Greater security measures may be applied to data model field values identified in such a way as private individual data in some cases. For example, an encryption layer may be added to all data model field values identified as potentially private individual data by including a decision element 306a immediately following the message element 304.

The decision element 306a in such an embodiment may route incoming data model field values based on whether they meet a preset criterion. For example, the decision element 306a may be associated with a statement, such as, "the incoming data model field value meets one or more of the search criteria provided by the user within the message element 304." If such an assigned statement proves true (e.g., the incoming data model field value meets the search terms for private individual data), this may indicate the incoming data model field value may contain private individual data, and the decision element 306a may route the integration process including that data model field value toward data process element 308, which may operate to apply added security, such as an encryption algorithm to the integration process. If such an assigned statement proves false, this may indicate the incoming data model field value likely does not contain private individual data, and the decision element 306a may route the integration process toward the map element 310b, and for more direct delivery to the destination defined at connector 312b. In some embodiments, the destination defined at connector element 312a may be the same destination defined at connector element 312b. In such an embodiment, the decision element 306a may operate to route all data model field values to the same destination, but may simply add the encryption defined by the data process element 308 to private individual data in one example embodiment.

Figure 3B:
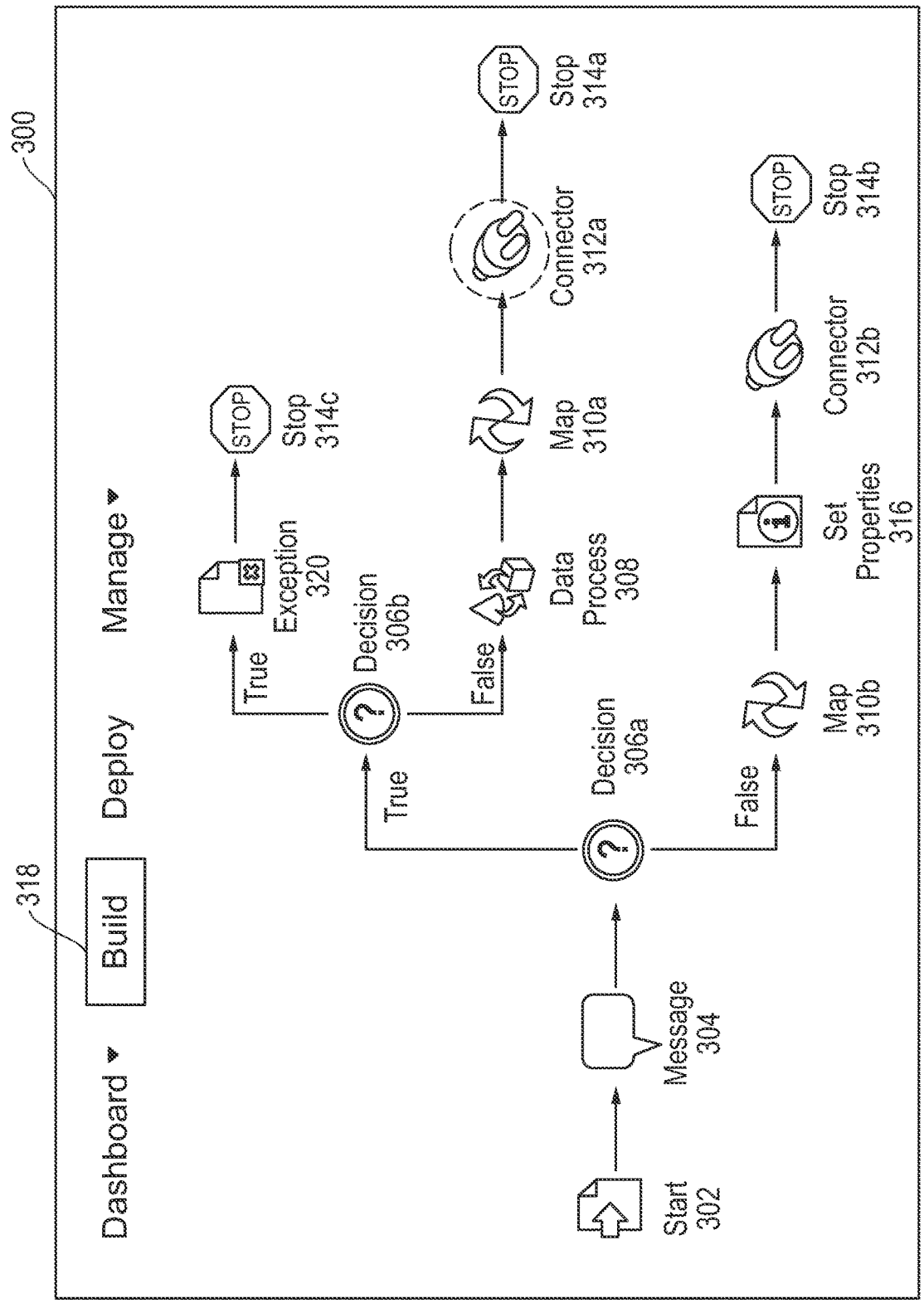
FIG. 3B is a graphical diagram illustrating a user-generated flow diagram of a data integration process providing added security according to an embodiment of the present disclosure.

FIG. 3B is a graphical diagram illustrating a user-generated flow diagram of an integration process providing added security for exchange of electronic data records containing personal information according to an embodiment of the present disclosure. As described herein, security of private individual data has become an increasing concern during the $21^{st}$ century, resulting in governmental regulations such as the GDPR, requiring controllers of personal data to implement appropriate data protection principles, and provide adequate explanation of the ways in which such personal data has been manipulated or transferred. The geographical data integration protection system in an embodiment may address these concerns by tracking the physical locations where data is stored or transferred throughout such an integration process, and, in some circumstances, inhibiting transfer of data to physical locations the user has identified as barred, or off-limits. Additionally, the private individual data integration protection system may interface with the geographical data integration protection system and either track the private individual data with the geographical data integration protection system or receive data descriptive of the manipulation of the private individual data and provide a report to, for example, a private individual data owner requesting such report. This too may be used to fulfill the government regulations like GDPR which may require any entity to describe at any given time how, when, where, and why a private individual data owner's private individual data was manipulated.

The geographical data integration protection system and private individual data integration protection system, in an embodiment, may determine that a data model field value has passed through a server in a geographic location, at a specific time, and why that private individual data was manipulated during a previous execution of an integration process. In a specific embodiment, the geographical data integration protection system may also take note as to whether the data model field value descriptive of private individual data passed through a user-barred server located in a specific geographical area and provide such data to the private individual data integration protection system to include in the report provided to the private individual data owner. For example, the geographical data integration protection system in an embodiment may determine that the server for the destination identified within the connector element 312a is physically located in a geographic location barred by the user or, alternatively, subjected to governmental regulations that may necessarily change the data included in the report to the private individual data owner. In such an embodiment, the geographical data integration protection system may label the connector 312a as a barred location for private individual data or may label the connector 312a as a server that is subjected to certain or different governmental regulations. In some embodiments, the geographical data integration protection system may notify the user of such an identification by highlighting (e.g., circling) the visual connector element 312a within the visual flow chart displayed by the graphical user interface 300. Still further, the private individual data integration protection system may concurrently operate with the geographical data integration protection system to determine how, when, and why the private individual data was passed through connector 312a.

In another specific embodiment, the geographical data integration protection system may update or edit the flow diagram for the integration process to terminate a portion of the integration process that allows for passage of the private individual data model field value through the barred location or through a location where the private individual data integration protection system will, due to governmental regulations, have to report to the private individual data owner. For example, the geographical data integration protection system in an embodiment may edit the process flow modeled within the "Build" tab 318 of the graphical user interface 300 to avoid such a risk. The geographical data integration protection system in such an embodiment may insert a second decision element 306b through which all data model field values identified as sensitive may pass. The decision element 306b may be associated with a statement, such as, "the downstream connector element 312a has been identified as being located in a barred geographic location." If such an assigned statement proves true, the decision element 306b may route the integration process including that data model field value toward the exception element 320, which may operate to automatically terminate the transfer of that data model field value. If such an assigned statement proves false, the decision element 306b may route the integration process toward the data process element 308, for encryption and delivery to the destination defined at connector element 312a. In other embodiments, the geographical data integration protection system may insert a new connector element (not shown), rather than the exception element 320. In such an embodiment, the new connector element may identify a different destination than the destination defined at connector element 312a. In such a way, the geographical data integration protection system may automatically update an integration process to avoid transfer of data to barred geographic locations, as defined by the user.

Regardless of the actions taken by the geographical data integration protection system to prevent the private individual data model field value from passing through a barred geographic location, the private individual data identification module of the private individual data integration protection system still monitors for any manipulation (e.g., transmission, reading, writing, copying, etc.) of the private individual data and notes such transmissions in, for example, a private individual data manipulation database. This database may contain any metadata that describes whether the private individual data was read, whether the private individual data was written, whether the private individual data was copied, or whether the private individual data was stored within any process of the data integration process. By looking at this metadata, the private individual data integration protection system may generate a report to an inquiring private individual data owner as to which connectors manipulated the private individual data owner's private individual data and, based on the type of connectors used in the data integration process, generate information on not only what specific applications or connectors were involved in the manipulation of the private individual data owner's private individual data but also the context as to why that private individual data of the private individual data owner was manipulated. For example, if a connector is defined as a billing application, the private individual data integration protection system may report to the private individual data owner that the private individual data was transmitted to a server maintaining the billing application for the purpose of updating a billing address in order to complete a billing process. This information may be included in the report to the private individual data owner who inquired regarding the manipulation of the private individual data owner's private individual data. This allows the user and creator of the data integration process as well as any third-party entities associated with the user to adhere to specific governmental regulations requiring transparency as to how any individual private individual data owner's private individual data is manipulated.

In some embodiments, the geographical data integration protection system and/or private individual data integration protection system may also highlight (e.g., circle) a visual element (e.g., connector) in an embodiment in which a transfer of a data model field value pursuant to code instructions associated with that visual element failed or was terminated for some reason. For example, in an embodiment in which the start element 302 is associated with code instructions for retrieving from an Application A a data model field value having a data model fieldname "Social-_Security_Number" or "Private Individual Data," Application A may abort or disallow such a retrieval. Application A may disallow such an action because it has separately labeled that data model field value as a sensitive data model field value, for example. In such an embodiment, the integration application management system may register an error has occurred during the integration process (e.g., by identifying failure to retrieve the data model field value from Application A), and highlight (e.g., circle) the visual element (e.g., start 302) at which the error occurred.

The integration application management system in such an embodiment may further prompt the geographical data integration protection system and/or private individual data integration protection system to determine whether the data model field value that failed to transfer falls within one of the user-defined dataset labels indicating it may contain private individual data. If the geographical data integration protection system in such an embodiment determines the data model field value that failed to transfer falls within one of the user-defined categories, the geographical data integration protection system may indicate to the user that this may be the cause of the error. Further, the geographical data integration protection system and/or private individual data integration protection system in such an embodiment may automatically update any statistics available to the user to reflect that the data model field value was not actually transmitted during the previous execution. In such a way, the geographical data integration protection system and private individual data integration protection system may provide accurate and up to date reports describing which data model field values labeled as containing potentially private individual data have been manipulated during a given integration process, and how according to an embodiment.

Figure 4:
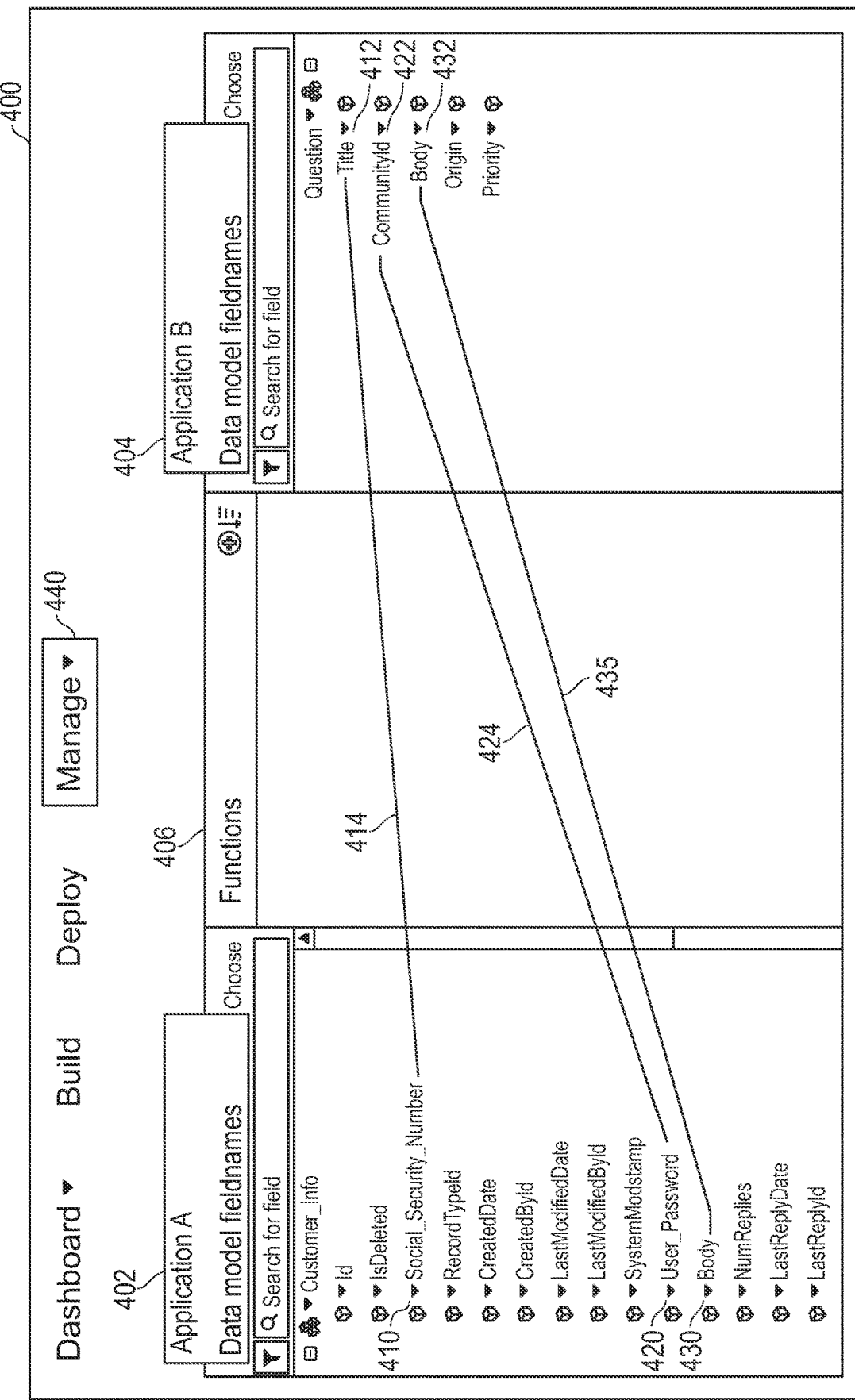
FIG. 4 is a graphical diagram illustrating mapping between multiple data model fieldnames for a single data model field value throughout a data integration process according to an embodiment of the present disclosure.

FIG. 4 is a graphical diagram illustrating fieldname lineage mapping between multiple data model fieldnames, each associated with a separate application for a single data model field value throughout a data integration process according to an embodiment of the present disclosure. As described herein, in addition to labeling a data model field value as falling within one of the preset categories describing types of personal information, the geographical data integration protection system and private individual data integration protection system may also track the movement of such a data model field value throughout the data integration process, to assist with the type of reporting required by the GDPR and issued to an inquiring private individual data owner by the private individual data integration protection system.

A fieldname lineage map may be displayed in an embodiment via a graphical user interface 400, which may correspond to the graphical user interface 300 described with reference to FIGS. 3A-3B. A user may create, view, or edit a fieldname lineage map in an embodiment by selecting the "Manage" tab 440 in an embodiment. An example fieldname lineage map in an embodiment may include a first column 402 listing one or more data model fieldnames for data model field values accessed, transmitted, copied, or otherwise manipulated by an "Application A," and a column 404 listing one or more data model fieldnames for data model field values accessed, transmitted, copied, or otherwise manipulated by an "Application B."

In some embodiments, a data model field value manipulated by Application A at one step within an integration process may also be manipulated by Application B at a later step within the same integration process. In other words, such an integration process in an embodiment may involve transmitting a data model field value from Application A to Application B. Thus, one or more of the data model fieldnames listed in column 402 may describe a data model field value that is also described by one or more of the data model fieldnames listed in column 404. For example, an integration process may include transmitting a data model field value that includes a social security number, having a data model fieldname "Social_Security_Number" 410, locatable by Application A, to Application B. It is understood that the data model fieldname "Social_Security_Number" 410 may include a specific type of private individual data such as secure national data and specifically a social security number associated with any of each of the private individual data owners as described herein. Such an integration process may also involve storing the data model field value that includes the social security number under a data model fieldname "Title" 412, locatable by Application B. Thus, a single data model field value that includes a social security number may be given two separate data model fieldnames (e.g., "Social_Security_Number" 410, and "Title" 412) at two separate points within the same data integration process. In such an embodiment, the mapping user interface 400 may associate the data model fieldname "Social_Security_Number" 410 from column 402 with the data model fieldname "Title" 412 from column 404 using link 414 for a mapping connector.

As described herein, users of the GUI describing the flow of the data integration process may use map elements to associate a first data model fieldname for a data model field value being retrieved from a first application or source with a second data model fieldname under which that data model field value will be stored at a second application or destination. For example, a previously created map element may associate the data model fieldname "Social_Security_Number," accessible by Application A with the data model fieldname "Title," accessible by Application B. This previously created map element may be used to make the link 414 between the data model fieldname "Social_Security_Number" 410 and the data model fieldname "Title" 412 within the fieldname lineage map.

Users may also provide, for the mapping element, an operation name that describes the purpose for changing the data model fieldnames of the data model field value in such a way. For example, the previously created mapping element may identify "Transfer of Vendor Contacts" as the operation name for changing the data model fieldname of the data model field value transferred from Application to Application B from "Social_Security_Number" to "Title." This user-defined function may be identified within the mapping element within the "functions" column 406 of the fieldname lineage map.

In another example embodiment, Application A may provide a data model fieldname "User_Password" 420 to describe a data model field value that includes a user password, and Application B may provide a data model fieldname "CommunityID" 422 to describe the same data model field value. It is understood that the data model fieldname "User_Password" 420 may include a specific type of private individual data such as security data and specifically a password associated with any of each of the private individual data owners as described herein. The fieldname lineage map in an embodiment may associate the data model fieldname "User_Password" 420 from column 402 with the data model fieldname "CommunityID" 422 from column 404 using a mapping connector 424. In still another example, Application A may provide a data model fieldname "Body" 430 to describe a data model field value for which Application B has also provided the data model fieldname "Body" 432. The fieldname lineage map in an embodiment may associate the data model fieldname "Body" 430 from column 402 with the data model fieldname "Body" 432 from column 404 using a mapping connector 435.

A data model field value may be labeled sensitive information falling into one or more user-defined categories (e.g., personal, financial, security, national, sensitive, or health) in some cases. For example, a user in an embodiment may label data model field values having a data model fieldname including the search term "social" as sensitive information (e.g., under the "national" category that includes social security numbers). In such an embodiment, the data model field value having the data model fieldname "Social_Security_Number" 410 may be labeled as falling within the "national" category of sensitive information. The data model fieldname "title" 412 in an embodiment may also be labeled as "national," despite not meeting the search term "social," because the data model fieldname "Title" 412 is linked via 414 to the data model fieldname "Social_Security_Number" 410.

As described herein, the geographical data integration protection system in an embodiment and private individual data integration protection system may trace the physical locations through which private individual data moves during a first execution of an integration process. For example, a user within an enterprise system or network may execute an integration process to transfer a data model field value between a source application or location and a destination application or location. As the data model field value travels between the source and destination, metadata identifying the servers (e.g., by URL, hostname, IP address, ports, databases, etc.) may be appended to the data model field value. The geographical data integration protection system in an embodiment may analyze such metadata using a geolocation service to identify the geographic location of each identified server through which the data model field value travelled as it moved from the source to the destination. Similarly, the private individual data integration protection system in an embodiment may analyze such metadata using to identify any manipulation of any of the private individual data associated with any specific private individual data owner. Further, the geographical data integration protection system may update the fieldname lineage map 400 to associate each manipulation of the data model field value made throughout the integration process with the identified geographic location at which each manipulation occurred. With the geographic location data obtained by the geographical data integration protection system, the private individual data integration protection system may also obtain specific data related to which governmental regulations are to be applied to the generation of the report sent to the private individual data owners upon request as described herein. In such a way, the geographical data integration protection system and private individual data integration protection system in embodiments may provide a lineage of each physical location at which a given data model field value is stored, transmitted, copied, or otherwise manipulated during an integration process.

FIG. 5 is a graphical user interface for searching, displaying, and generating reports describing data model field values labeled as private individual data that are involved in a data integration process according to an embodiment of the present disclosure. As described herein, upon request of, for example, an EU citizen whose private individual data has been included within an integration process, an adherent to the GDPR (e.g., entity performing data integration processes) must provide adequate explanation of the ways in which such private individual data has been manipulated or transferred and for what purposes. In addition, one way for an enterprise system executing data integration processes to protect against infringement involves tracking the content of data model field values being integrated, and the ways in which such private individual data is being manipulated.

Similar methods may also assist in deterring or lessening potentially hefty fines if an infringement should occur. The level of fine levied against a non-compliant entity is determined according to a variety of factors, that include the extent of the infringement (e.g., number of people affected and damage caused thereto), mitigating acts taken by the non-compliant entity following infringement, preventative measures taken by the non-compliant entity prior to the infringement, what types of data were impacted by the infringement, and whether the non-compliant entity promptly notified those who were affected by the infringement, among others. In the unfortunate event of an infringement, enterprises executing data integration processes may at least decrease the amount of the resultant penalties by providing detailed metrics describing data affected by each integration process, individuals whose information was incorporated within such data, and the ways in which such data was accessed, copied, transferred, or otherwise manipulated in an infringing integration process. Such detailed information may indicate preventative and mitigating measures were taken, and may assist in notification of individuals and private individual data owners impacted.

FIG. 5 illustrates the display of information describing properties of data model field values and the ways in which a data integration process manipulates such data model field values, in a searchable format, for easy generation of reports in an example embodiment. For example, such reports may be generated from data shown in FIG. 5 to comply with GDPR requirements. For example, the graphical user interface 500 (which may correspond to the graphical user interfaces 300, and 400, described with reference to FIGS. 3A-3B, and 4, respectively) may allow a user to view properties describing all data model field values labeled under any of the sensitive categories described herein occurring within a single integration process, or across a plurality of integration processes, by selecting the "Manage" button 524. A user may initiate a search for data model field values labeled as private individual data in an embodiment by selecting a process executed on one or more data model field values in one or more data integration processes at the search field 516. For example, a data integration process that involves transmitting a plurality of data model field values, each describing different contact information for a vendor, between a first application (e.g., NetSuite®) and a second application (e.g., SalesForce®). Such an integration process may be named "attach contact to vendor" in an embodiment. A user may search each of the data model field values transmitted between these applications pursuant to the "attach contact to vendor" process within the search field 516 in order to view a description of the ways in which that process manipulated data model field values identified as private individual data or likely to include personal information and some insight into purpose of data manipulations. In other embodiments, the user may search across multiple processes simultaneously to view descriptions of the ways in which multiple processes manipulate similarly labeled data model field values. In still other embodiments, the user may search across all integration processes, or may narrow search results generated with respect to one or more identified processes by entering a search term within the field 518.

In a specific embodiment, the private individual data integration protection system may search across all integration processes automatically in order to generate a report to a private individual data owner based on a query received from the private individual data owner. As described herein, the business integration application management system may receive, at a NIC, a query from a specific private individual data owner. The query may be in response, for example, from the specific private individual data owner hearing a news report indicating that certain databases associated with the applications, industries, or even the data integration process have been compromised. In order to determine whether this private individual data owner's private individual data has been exposed to potentially being compromised and in order to fulfill those governmental regulations associated with operating the data integration process, the business integration application management system may respond to this query via a report detailing how, when, and why the private individual data owner's private individual data was manipulated. The business integration application management system may do this by first passing the query onto a parsing module. The parsing module may initiate a parsing process in order to provide the private individual data integration protection system with specific words or phrases that indicate the private individual data owner is requesting data related to how their private individual data has been manipulated and, in some instances, when that private individual data was manipulated. The parsing module may also parse the identity of the private individual data owner to search for private individual data specific to that owner.

The private individual data identification module may have identified specific data model field values labeled as private individual data in an embodiment and provided that metadata to the private individual data integration protection system in order to facilitate in the generation of the report to the private individual data owner. In a specific embodiment, the private individual data integration protection system may cross reference the private individual data owner's identification (e.g., legal name, username, specific ID number, etc.) with any private individual data that was manipulated at any data model field value within the data integration process. Based on the display of information describing properties of data model field values and the ways in which a data integration process manipulates such data model field values found in FIG. 5, the private individual data integration protection system may readily understand what private individual data associated with the private individual data owner was manipulated, at what servers that private individual data was manipulated, and why that private individual data was manipulated. Because this report is private individual data owner specific, the private individual data integration protection system may simply retrieve that metadata associated with the tracking of the specific private individual data owner's data within one or more integration processes by the private individual data integration protection system and the geographical data integration protection system and provide a report to the private individual data owner as described.

In a specific embodiment, the graphical user interface 500 may be used by a user to manually answer the query from a private individual data owner with the user reviewing the data presented in the graphical user interface 500 and generating a report as described. In this embodiment, the graphical user interface 500 may include a search field 518 to insert one or more identifications of the private individual data owner which results in limiting data being presented in the graphical user interface 500 to those data integration processes describing the manipulation of private individual data associated with the private individual data owner.

The graphical user interface 500 in an embodiment may display information describing the types of data model field values labeled private individual data and the ways in which the selected integration processes manipulated such data model field values. For example, column 504 may identify the data model fieldname for each data model field value labeled as private individual data information, and column 502 may list the category of private individual data within which each data model field value falls, including personal, security, national, financial, sensitive, or health. As described herein, each of these categories is user-specified. Thus, other embodiments may include any category designation provided by a user, and each of these categories may be associated with preset, user-defined data model fieldname search terms. For example, a user may define a private individual dataset label category for intellectual property. Although embodiments of the present disclosure describe search terms for identifying data model field values containing potentially sensitive personal information, it is contemplated that users may provide other search terms to identify data model field values for purposes other than security of personal information. For example, a user in an embodiment may provide a search term "http" and a user instruction to label data model field values associated with data model fieldnames matching this search term as likely to be managed in a cloud computing space.

The graphical user interface 500 may further provide information regarding the ways in which the integration process or processes identified in field 516 manipulated that data model field value. For example, column 506 may describe the shape of the visual element associated with the code instructions in which the data model fieldname listed in column 504 was identified pursuant to the user-defined search for sensitive information. More specifically, in an embodiment described with reference to FIG. 3A, each of the plurality of visual elements selected by the user for inclusion within the integration process modeled by the visual flow may be associated with executable code instructions. For example, the user may insert a start element 302 within a process flow for attaching contact information to a vendor to represent retrieving a data model field value associated with a data model fieldname "Social_Security_Number" from a first application (e.g., NetSuite®). As another example, the user may also insert a connector element 312a or 312b within the same process flow to represent transmitting the data model field value retrieved at element 302 to a second application (e.g., SalesForce®) and storing it with a data model fieldname "Title." The user in such an embodiment may name the start element 302 "Application A vendor lookup," and name the connector elements 312a and 312b "Application B vendor store." Each of these visual elements may represent a code set that identifies the data model field value being transmitted between Application A and Application B in an embodiment. For example, the start element 302 may represent executable code instructions for retrieving a data model field value having a data model fieldname "Social_Security_Number," and the connector element 312a or 312b may represent executable code instructions for storing that same data model field value under a data model fieldname "Title."

In an embodiment described with reference to FIG. 4, the geographical data integration protection system may identify both the data model fieldname "Social_Security_Number" 410 and its linked data model fieldname "Title" 412 as national sensitive information. This may be accomplished by searching the code instructions represented by the visual elements within the process flow for a user-specified search term (e.g., "social"). Returning to FIG. 5, in such an embodiment, the graphical user interface may display the data model field value having the data model fieldname "Social_Security_Number" as falling within the "National" category within the top row, and the (same) data model field value having the data model fieldname "Title" as falling within the "National" category within the second from the top row. In the top row, the graphical user interface 500 may associate the data model fieldname "Social_Security_Number" in column 506 with a visual element having a connector shape, because it is associated with the start element 302 within the modeled process flow, and may associate the data model fieldname "Title" with a connector shape, because it is associated with the connector element 312*a* or 312*b*.

Column 508 in an embodiment may describe the name assigned to the visual element representing the code instructions in which the data model fieldname listed in column 504 was identified. For example, in the top row of the graphical user interface 500, the data model field value having the data model fieldname "Social_Security_Number" identified in the code instructions represented by the start element 302 may be associated in column 508 with the name "Application A vendor lookup," that the user assigned to the visual element 302. As another example, in second from the top row of the graphical user interface 500, the data model field value having the data model fieldname "Title" identified in the code instructions represented by the connector element 312*a* or 312*b* may be associated in column 508 with the name "Application B vendor store," that the user assigned to the connector element 312*a* or 312*b*.

In an embodiment, a user may choose a process component it uses often when interfacing with a specific application, and define the parameters of that process component by providing parameter values specific to that application. If the user wishes to use this process component, tailored for use with that specific application repeatedly, the user may save that tailored process component and name it based on the specific application for which it is tailored. For example, if the user uses a process component for interfacing with NetSuite® or SalesForce® in several different integration processes, the user may wish to save this process component for later use by saving it as a NetSuite® or SalesForce® process component. In an embodiment, if a user has saved a connector element with a name identifying the application accessed by that connector element, the graphical user interface 500 may display that application name within column 510. For example, the user interface 500 may associate the connector element named "Application A vendor lookup," as identified in the top row of column 508 with the type "Application A" in column 510. As another example, the user interface 500 may associate the connector element named "Application B vendor store," as identified in the second to top row of column 508 with the type "Application B" in column 510.

Column 512 in an embodiment may identify a geographic location of a server where a data model field value identified as sensitive has been stored, pursuant to, or as described by the integration process selected by the user in field 516. For example, the integration process named "Attach Contact to Vendor" may execute code instructions to retrieve a data model field value having a data model fieldname "Social_Security_Number" from a NetSuite® server located in Chile and transmit that data model field value for storage under the data model fieldname "Title" at a SalesForce® server located in the United States. In such an embodiment, the graphical user interface 500 may list both the United States and Chile within the column 512. In other embodiments, the column 512 may list each of several physical locations through which a data model field value passes in order to move from the source location to the final destination location. The geographical data integration protection system in an embodiment may determine these locations, as described herein, by geolocating each of the servers through which a data model field value travels during an executed integration process (including intermediate stops between a source and a destination), as identified in metadata appended to the data model field value at the final destination of that integration process. Concurrently, the geographical data integration protection system may provide this identified metadata to the private individual data integration protection system for development of the report to a private individual data owner as described herein.

In some embodiments, the geographical data integration protection system may highlight or otherwise notify the user of the graphical user interface 500 that a data model field value marked as private individual data has passed through a geographic location identified by the user as unsafe or barred or may simply provide a notification that a data model field value marked as private individual data has passed through a specific geographic location. In a specific embodiment, the geographical data integration protection system in an embodiment may receive a user instruction to identify servers in Chile as unsafe for storage or receipt of data model field values marked sensitive. In such an embodiment, the geographical data integration protection system may highlight or otherwise call the user's attention to each of the rows displayed in the graphical user interface 500 in FIG. 5, to indicate previous passage or storage of private individual data model field values at a server within Chile. Alternatively, this highlighting may include simply highlighting those distinct geographic locations where the geographical data integration protection system may be notified where the private individual data of a specific private individual data owner has passed or otherwise manipulated.

In some embodiments, the user may even narrow this instruction to identify a given geographic location as unsafe for storage or receipt of data model field values falling within only one of the user-defined dataset label categories. Alternatively, or additionally, the user may narrow this instruction to identify a given geographic location as being subjected to a specific governmental regulation as described herein. In some embodiments in which a user has defined a dataset label category for intellectual property, the geographical data integration protection system may receive a user instruction to identify servers in the United States as inappropriate for storage or receipt of data model field values marked "intellectual property." This may be the case, for example, if the user is transferring data describing an invention on which the user has yet to apply for a patent within the United States. In such a scenario, the geographical data integration protection system may highlight or otherwise call the user's attention to rows within the graphical user interface 500 where data model field values marked "intellectual property" have moved through servers within the United States. In still other embodiments, the user may search for such entries by entering "intellectual property" and "United States" within the search box 518.

In an embodiment in which a user searches across several processes using the search field 518, the graphical user interface 500 may display data model field values matching the user-provided search term that are the subject of a plurality of processes. In such an embodiment, the graphical user interface 500 may list each of these data model field values, and may associate the data model fieldnames for each of these data model field values given in column 504 with the name of the process, given in 514, in which that data model field value is accessed, transferred, copied, or otherwise manipulated.

A user may instruct the graphical user interface to display results in the tabular view shown in FIG. 5, or in a text format by toggling the display format button 520. Output of searches made using the graphical user interface 500 in an embodiment may be exported or printed in a variety of different coding languages. For example, a user in an embodiment could select one of the listed data model fieldnames or rows displayed in the graphical user interface, then instruct the geographical data integration protection system or private individual data integration protection system to export the code instructions where that data model fieldname was identified and labeled as private individual data by selecting the export button 522. Upon selection of the export button 522 in an embodiment, the user may be prompted to choose from a plurality of coding formats (e.g., JSON, XML) in which the user wishes those data structures to be displayed. A user may also export the entire tabular output of the information displayed within the graphical user interface 500 in some embodiments. In this manner, a report may be made and presented to a user either automatically or by operation of the graphical user interface 500 as described herein.

In some cases, data model field values may fail to transfer from a source to a destination as identified within an integration process flow diagram and accompanying code instructions. For example, in an embodiment described with reference to FIG. 3B, in which the start element 302 is associated with code instructions for retrieving from an Application A a data model field value having a data model fieldname "Social_Security_Number," Application A may abort or disallow such a retrieval. In such an embodiment, the geographical data integration protection system may determine the data model field value that failed to transfer falls within one of the user-defined categories, and may indicate to the user that this may be the cause of the error. For example, the geographical data integration protection system in such an embodiment may highlight the top row of the table displayed on the graphical user interface 500 to indicate the code instructions associated with the start element failed to execute properly.

Further, the geographical data integration protection system and/or the private individual data integration protection system in such an embodiment may automatically update any statistics available to the user to reflect that the data model field value was not actually transmitted during the previous execution. For example, if Application A did not release the data model field value associated with the data model fieldname "Social_Security_Number," the business integration application management system in such an embodiment may not have stored a data model field value with the data model fieldname "Title" (or may have stored a null or empty field) at Application B. In such an embodiment, the geographical data integration protection system or the integration application management system may remove the second from the top row of the table displayed on the graphical user interface 500, to accurately reflect that the data model field value did not actually transfer pursuant to the previously executed integration process. Any visual representations of such data, other than tabular or textual format (e.g., pie chart, bar chart, etc.) generated based on the information shown in the graphical user interface 500 may also be edited to reflect the failure of the data model field value to transmit. In such a way, the geographical data integration protection system working concurrently with the private individual data integration protection system in an embodiment may provide an accurate and up to date report at the graphical user interface 500 of which data model field values containing personal information were accessed, transferred, or otherwise manipulated during an integration process and how, as well as the applications/locations/enterprises at which such access or manipulation occurred. This report at the graphical user interface 500 may assist a user or may assist the private individual data integration protection system in generating a report to the private individual data owner based on the applicable governmental regulations.

Figure 6:
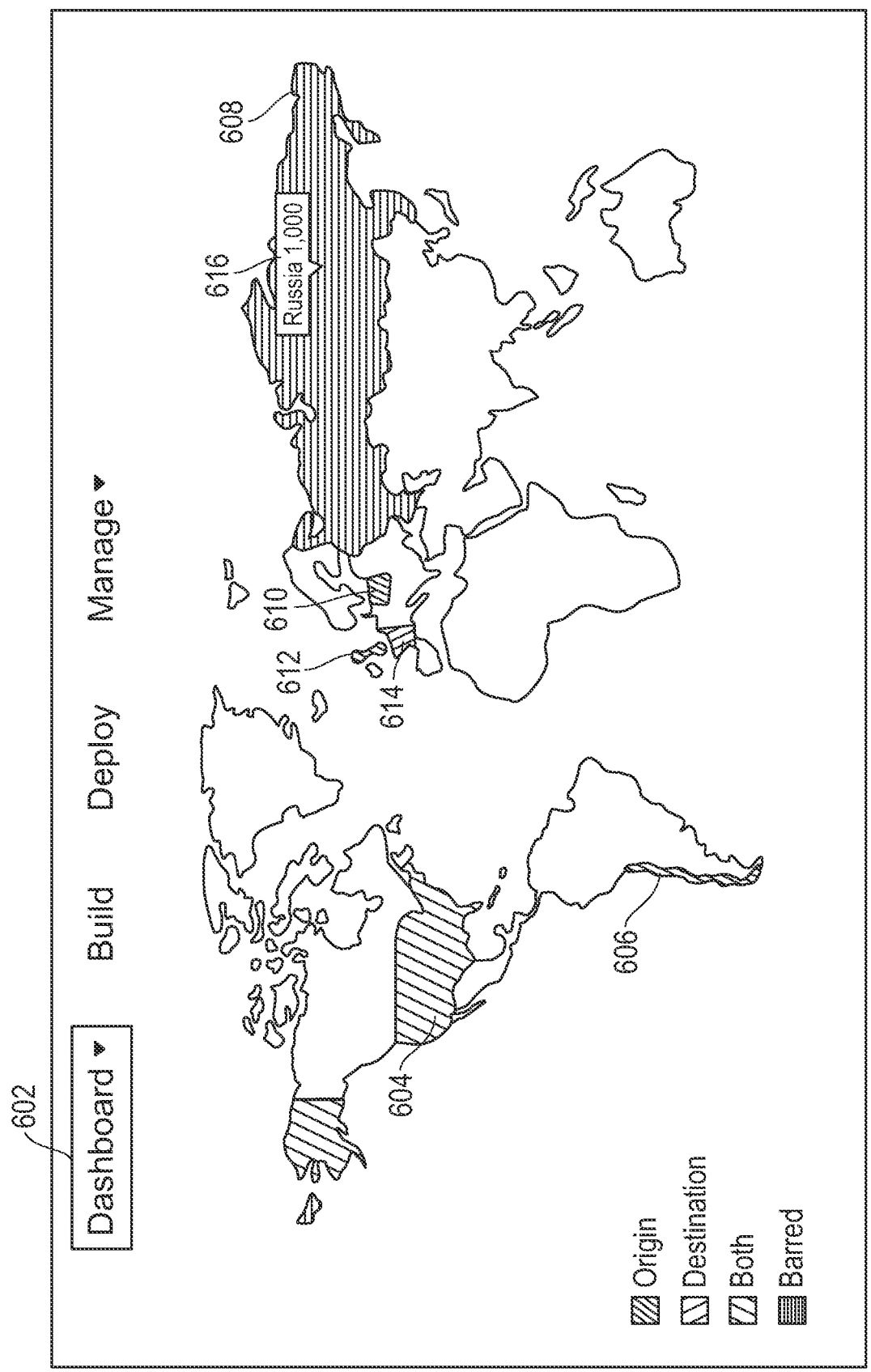
FIG. 6 is a graphical diagram illustrating a graphical user interface for viewing geographical movement of private individual data according to an embodiment of the present disclosure.

FIG. 6 is a graphical diagram illustrating a graphical user interface for viewing geographical movement of private individual data during a previously executed integration process according to an embodiment of the present disclosure. As described herein, there is a need for enterprises executing a data integration process to track each of the physical locations where private individual data is stored, transferred, or otherwise manipulated throughout such a data integration process, including intermediate stops between the source and final destination where data model field values may have been stored temporarily as well as those applications (e.g., connectors) that have manipulated the private individual data. For example, an enterprise may wish to avoid the transfer of data including intellectual property to countries in which patents on such subject matter have yet to be filed. Additionally, certain data such as the private individual data may need to be tracked regardless of the locations is passes through in order for the private individual data integration protection system to generate a report to the private individual data owner upon receipt of the query from the private individual data owner. As another example, enterprises may view security of servers in certain geographical location to be questionable (e.g., in countries in which data protection regulations are not applied or enforced). In such scenarios, a method of notifying the user of a potential risk is needed or to notify a private individual data owner that their private individual data was routed and or stored in a server that may have been accessed by a nefarious third-party.

The geographical data integration protection system in an embodiment may trace each of the physical locations through which private individual data moves during a first execution of an integration process, and reporting the movement of private individual data during such a process. The geographical data integration protection system in an embodiment may determine each of these locations, as described herein, by geolocating each of the servers through which a data model field value travels during an executed integration process, as identified in metadata appended to the data model field value at the final destination of that integration process. The geolocation data descriptive of these servers may be used by the private individual data integration protection system to help generate a report to the private individual data owner and specifically provide additional details as to specific geographic locations where the private individual data owner's private individual data is manipulated, stored, or transferred.

Upon identification of the locations of servers through which data model field values identified as sensitive has travelled during an execution of an integration process, the geographical data integration protection system in an embodiment may display these locations via the "Dashboard" submenu 602. The Dashboard 602 of the graphical user interface 600 may display a map of the globe or portions thereof through which a data model field value identified as meeting a user-defined dataset label has passed in a previously executed integration. In other embodiments, the map displayed within the graphical user interface 600 may provide a view of a smaller region, such as within a single continent, country, city, state, or preset radius of distance from specific GPS coordinates.

As an example, a data model field value labeled as "National Sensitive" (or other user-defined sensitive category) may have passed through a plurality of servers located in Chile, Russia, Germany, and the UK prior to reaching an end destination in France. The geographical data integration protection system in such an embodiment may highlight or otherwise call the user's attention to each of these countries. The geographical data integration protection system in an embodiment may further define whether the highlighted locations were the original source for the data model field value, the final destination, or a stop along the way (identified as "both"). For example, the United States may be labeled at 604 as the source for the data model field value transmitted during the previously executed integration process, and France may be labeled at 614 as the final destination. The geographical data integration protection system in such an embodiment may also label Chile 606, Russia 608, Germany 610, and the UK 612 as "both," indicating the data model field value may have passed through servers within these locations on the way from the US 604 to France 614. With this data, again, the private individual data integration protection system, after having received it from the geographical data integration protection system, may provide this data on a report provided to the private individual data owner as described herein. In a specific embodiment, the report may further provide this data to the private individual data owner based on specific parsed text or phrases in the private individual data owners inquiry that the private individual data owner wishes to specifically know if their private individual data passed through certain geographical areas. In this embodiment, the private individual data integration protection system may receive the parsed text or phrases and interpret them as a specific request to know more about a potential data breach within a specific geographical area and whether their private individual data was viewed. Although this scenario is merely an example of potential uses of the business integration application management system by a private individual data owner, other types of inquires may be presented by the private individual data owner in the query and the present specification contemplates the use of the business integration application management system for these purposes.

The geographical data integration protection system, in an embodiment, may also highlight countries the user has designated as barred within the graphical user interface 700 in an embodiment. For example, a user may have identified Russia as a barred location in an embodiment. In such an example embodiment, the geographical data integration protection system may label Russia 608 as barred. The geographical data integration protection system in an embodiment in which a private individual data model field value has been identified as passing through a barred geographic area (e.g., Russia 608) may also display the number of private individual data model field values that passed that area. For example, the geographical data integration protection system in such an embodiment may display the number 1,000 at 616 to indicate that one thousand private individual data model field values passed through the barred country of Russia 608 pursuant to a previously executed integration process. Defining the overall movement of the data model field values pursuant to such a process, as well as the volume of private individual data model field values passing through barred countries may assist enterprises in determining how best to manage such data model field values in future data integration process executions.

Figure 7:
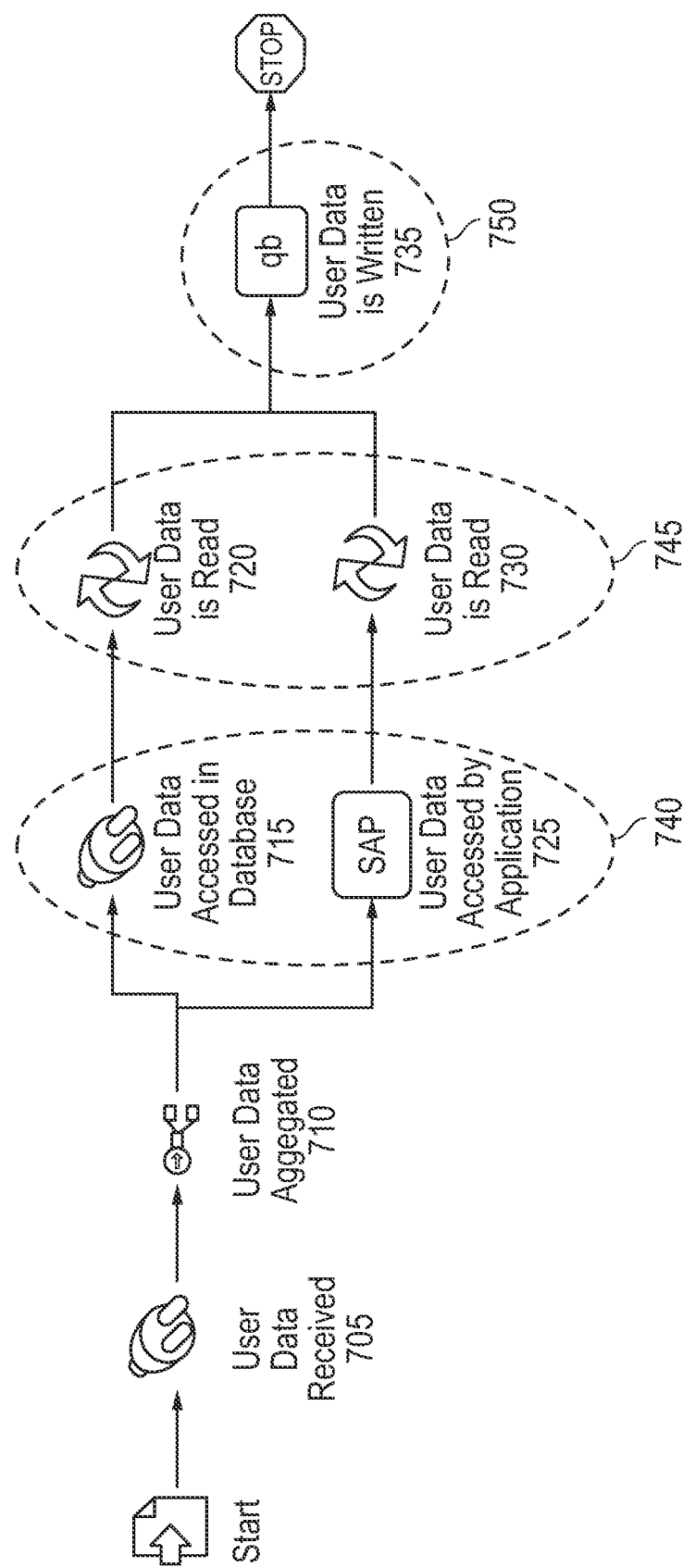
FIG. 7 is a graphical diagram illustrating a user-generated flow diagram of a data integration process providing data tracking of private individual data through the data integration process according to an embodiment of the principles described herein.

FIG. 7 is a graphical diagram illustrating a user-generated flow diagram 700 of a data integration process providing data tracking of private individual data through the data integration process according to an embodiment of the principles described in the present disclosure. The modeled process flow is similar to that shown in FIGS. 3A and 3B, however this process flow is an example modeled business integration process that may be utilized by a private individual data integration protection system to track and determine what manipulations occurred as described in the present example embodiment of FIG. 7. Additionally, the private individual data integration protection system coordinates with a geographical data integration protection system that may be part of the private individual data integration protection system or separate to track locations where private individual data was read from, written to, transferred, copied or otherwise viewable from business integration processes developed by a user. The business integration process or processes may have modeled and developed using the business integration application system of embodiments herein. During the course of development of one or more business integration processes, labels may be established and metadata generated from labels, development, actions, third party interactions, and generated runtime code sets or their transmission. Further, some metadata and labels may be generated from the previous execution that occurs of the one or more business integration processes.

Labels and metadata may be generated by the business integration process or processes to determine manipulation of data, including private individual data in some cases, via reading from, writing to, transferring, copying, or other processing during execution or based on how executions will occur based on modeling and development. Examples of labels or metadata may include labels or metadata for identifying sensitive data types or generally identifying data types from input and target dataset fieldnames, labels or metadata describing mapping transfers or other actions of the business integration process, labels or metadata describing locations of "atoms" or execution locations of runtime executable code portions of the business integration process(es), metadata from execution logs of the business integration process(es) tracked by a service provider or enterprise, any service provider metadata of business integration process development from composition logs tracked by a service provider, or the like in various embodiments. The private individual data integration protection system may execute searching with an intelligent searching mechanism such as a machine learning classifier or the like to match parsed terms from an inquiry about private individual data to search the variety of labels and metadata sources such as those described above in an embodiment. Further, the private individual data integration protection system may also inspect the data, such as metadata and labels generated by the business integration process during active execution of the business process in some embodiments. In yet other embodiments, some security measures such as imposition of geographic restrictions via the geographical data integration protection system may be implemented for future executions of business integration processes.

The private individual data integration protection system of embodiments herein may interface with the parsing module described to parse with an artificial intelligence parsing system the terms of an inquiry into private individual data received for a private individual data owner. The inquiry may be received via a web interface, in an example embodiment, where a private individual data owner or another inquirer such as a government regulator or an enterprise administrator may input a query about private individual data. This same web interface, in an example embodiment, may provide automatic responses explaining the contents of a report generated by the private individual data integration protection system about the private individual data query. In at least one embodiment, the web interface may be linked through a portion of the business integration application management system operating on a service provider server systems or cloud resources or on an enterprise's server systems or cloud resources. Other methods of receiving private individual data queries are also contemplated including via electronic communications such as email, IM, text, or audio communications and the private individual data integration protection system may be searched by a user from the enterprise or via a service provider employee.

The private individual data integration protection system may also interface with the geographical data integration protection system for determination of locations for reading, writing, transfers, executions of runtime processes, or other execution of actions within the business integration process or processes executed in embodiments. The geographical data integration protection system may track but also generate prohibitions for such executable actions occurring with the business integration process or processes. Finally, the geographical data integration protection system may also provide information relating to which potential governmental regulations of private individual data may need to be followed based on jurisdictions that may be relevant to operation of the business integration process or processes.

Finally, the private individual data integration protection system may interface with an internal system of a private individual data identification module that may apply one or more intelligence techniques of supervised learning systems, such as a machine learning classifier, deep learning neural networks, or other artificial intelligence, as well as correlation techniques to match the parsed query terms with the various sources, logs, aggregations, or other sources of metadata and descriptions relating to the business integration process. For example, embodiments of the private individual data identification module may match, via artificial intelligence techniques and correlation techniques, the metadata from the business integration processes or processes with forms of potential private individual data identified by parsed query terms that may have been manipulated or transferred within the business integration process or processes. Further, embodiments of the private individual data identification module may match, via artificial intelligence techniques and correlation techniques, identification of a private individual data owner of interest in a query with potential sensitive data sources or context information from metadata or labels associated with one or more relevant business integration processes.

FIG. 7 may begin with the process-representing visual elements may include a start element 705. As can be seen, the at the start element and connector 705, executable computer program code may be executed to connect to one or more ports for connecting to and retrieving input data which may then be aggregated at data aggregator shape 710. For example, input data, including potential private individual data owner data, is received at connector 705 from connections initiated at the start element, such as from a customer or other trading partner database or multiple trading partner databases. Received data, including potentially some the private individual data, is aggregated at a data aggregator 710 as part of the business integration process. The business integration process proceeds to connector 715 and connector 725 in a bifurcated process chain where input data may be read via an input database or input application specific connector respectively.

Connector 715, for example, may format reading from a particular database such as customer or trading partner database or an internal enterprise database. Connector 715 may be tailored to the processes, parameters, fieldname types and other factors to read from the particular database structure in an example embodiment. Connector 715 may operate to read data from a proprietary or secure data center customer database or a database with particular access requirements or authorizations managed by executable code resulting from connector 715 and its settings.

Connector 725 may provide for input data, including potential read from a particular application type at a trading partner or internal to an enterprise. Connector 725 may be tailored to the processes, parameters, fieldname types and other factors to read from the particular application environment in an example embodiment. As shown in the example of FIG. 7, connector 725 may operate to read data from SAP® customer relationship management software application environment which may also have particular access requirements or authorizations managed by executable code resulting from connector 725 and its settings.

During operation of the data integration process, the private individual data may be read from a proprietary or database via the settings, determined fieldname values, or other parameter settings of connector 715 in an embodiment. In another embodiment, the private individual data may be read, for example, from a third-party private individual data owner relationship management application via the settings, determined fieldname values, or other parameter settings of connector 725. There may be labels and metadata generated during the modelling set up of shapes 715 and 725 as well as for shapes 705 and 710 to connect through to and aggregate input data, which may indicate types of input data received, from where, and other aspects of the input data that may indicate private individual data. Further, during execution of the business integration process of FIG. 7, execution logs and other metadata may be generated indicating metadata information about private individual data manipulated (e.g., read from, written to, transferred, copied, etc.) by the business integration process shapes 715 and 725. Such metadata information may be gleaned from previous executions of the business integration process of FIG. 7 as well as from ongoing executions of the same.

The private individual data integration protection system may scan and track metadata at 740 and identify where types of sensitive, private individual data may have been read via shapes 715, 725, as well as 705 and 710. With the parsing module having parsed the query for private individual data inquired about the identity of private individual data owner and other factors such as dates, times, locations or other aspects of a query, the private individual data identification module will have determined matches for the inquiry relating to all parsed aspects about the query received. Using the artificial intelligence and matching techniques of private individual data identification module, the private individual data integration protection system may then scan at 740 the input data that has been read by the business integration process and may identify that any matching private individual data may have been read from a proprietary or secure data center database via shape 715 or from a software environment maintained by an enterprise or trading partner at shape 725 (e.g., a SAP software environment).

The access made to the private individual data at a private individual data owner data database at connector shape 715 by the business integration process or read, for example, by from a software application environment at connectors shape 725, may be determined as read actions at those parts of the business integration process by the private individual data application protection system as indicated by circle 740. As such, the private individual data application protection system may indicate that the private individual data owner's private individual data was modified from its original state being stored in the proprietary or secure data center database at to a later modification of the business integration process as discussed further below. Such manipulation may need to be tracked under certain governmental regulations such as the GDPR. The read actions and from what types of databases and locations may be recorded by the private individual data application protection system for generation of a report or response to the query. Hereafter, either additional modifications of that private individual data are also recorded if available, or the data integration process ends with an explanation as to the modification of the private individual data so far.

The data integration process continues in FIG. 7 with a determination from mapping shapes 720, 730 of the mapping the input datasets, including any private individual data therein, to a target dataset for a target application or database. The business integration process may provide for input data including private individual data to be read, written, or otherwise modified by the execution of the data integration process at the database specific connector shape 715 and the application specific connector shape 725. Such manipulations must be mapped via mapping shapes 720 and 730 respectively to one or more target datasets for a target application or database environment. As may be seen, the business integration process will proceed to a target dataset for a target application environment connected to via connector shape 735. In the shown example embodiment, connector shape 750 may be a QuickBooks® application environment.

As indicated by a second circle 745, the private individual data application protection system will assess and track metadata or labels associated with the data mapping steps 720 and 730 from the read action of database specific connector 715 and application specific connector 725 for linking to whatever format will be required to perform the manipulation action at connector shape 735 (e.g., a write action to QuickBooks®). This tracking of mapping of labeled or otherwise identified sensitive, private individual data by the private individual data integration protection system in an embodiment may indicate the data fieldnames that may identify which particular private individual data is being manipulated by the business integration process. Tracking the metadata for input dataset fieldnames, output dataset fieldnames, links indicating correspondence, and any comment metadata indicating functions or sensitivity classification that may be indicated may be gleaned by the private individual data application protection system at the location in the business integration process indicated by the second circle 745. As described herein, the private individual data may include a plurality of types of private individual data, including personal data, sensitive data, security data, health data, financial data, or national data in various embodiments.

In the example data integration process of FIG. 7, the input data may be used from the example customer relationship management application as read at connector shape 725 and assessed at first circle 740 to help update data, including private individual data owner data at, for example a QuickBooks® application via connector shape 735 writing to the target application. In another aspect of the example of FIG. 7, the input data may be used from the example secure data center database as read at connector shape 715 and assessed at first circle 740 to help update data, including private individual data owner data at, for example a QuickBooks® application via connector shape 735 writing to the target application. The mapping to the target application (e.g., QuickBooks®) at 720 and 730 from the identified sources of input data may indicate to the private individual data integration protection system that the purpose of these manipulations of the private individual data was to update, for example, a billing address at the target application maintained at the enterprise or at an engaged trading partner. In this example, therefore, the type of private individual data being modified is personal information related to the private individual data owner's address as identified by the private individual data integration protection system at the mapping shapes 720 and 730 as discerned by the private individual data integration protection system. This information determined at circle 745 may be recorded and represented in the report provided by the private individual data integration protection system to a private individual data owner.

Proceeding to the target application specific connector shape 735, the private individual data integration protection system may determine that the target application is the customer relationship management application or other application that is part of the business integration process shown in FIG. 7. As identified in the third circle 750, the target application connector is set to execute a write action or other manipulation to the received and mapped input data, including any private individual data. The private individual data integration protection system may track this manipulation and retrieve any metadata and label information including labels of data sensitivity types, purpose of manipulation, or metadata indicating a purpose of a target application environment or database. This manipulation activity may be associated by the private individual data integration protection system at the third circle 750. The target dataset fieldnames or location within the target application may be determined based on the file structure or hierarchy locations and labels used at the target application and connected to by the target application specific connector shape 735. For example, the private individual data may be determined to be targeted to QuickBooks®, an accounting software and, further, may be targeted to billing information. Thus, the billing address of a private individual data owner to be written to a billing section of QuickBooks® accounting software may be determined to have been manipulated to update a billing address in QuickBooks® to facilitate automated billing invoices or billing activities.

Finally, execution logs that indicate start shape activity, stop shape activity, and operation of connectors executing any interim step of manipulation according to the business integration process, such as shown in FIG. 7, may provide temporal metadata about manipulations. For example, the private individual data integration protection system may determine metadata from such business integration process shapes that indicate calendar dates, times of day, durations, and other temporal information about the manipulations of private individual data by the business integration process or processes.

Additionally, as described herein, the geographical data integration protection system may track where the private individual data is being stored while the private individual data integration protection system tracks each modification (e.g., reading, writing, copying) of the private individual data as it passes through the data integration process. With reference to FIG. 5, each modification may be presented in a graphical user interface 500 and metadata describing each modification of any given private individual data owners' private individual data may be recorded and stored by the private individual data integration protection system at, for example, a dedicated database used to store the metadata.

Before, during or after one or more rounds of the data integration process have been executed, the business integration application management system may receive a query from a specific private individual data owner requesting a report descriptive of how their private individual data has been modified by the execution of the data integration process. Because the private individual data integration protection system and geographical data integration protection system have traced the modification of any given private individual data, the report may be readily provided to the private individual data owner or other inquiring entity in response to the query received. This may be done automatically by the business integration application management system or may be done manually through interaction with a user of the business integration application management system tasked to answer private individual data owner queries.

As descried herein, the specificity of the report generated may vary depending on what any governmental regulations require. In a specific embodiment, the report to the private individual data owner may include information regarding the category of the private individual data. In the example shown in FIG. 7, the category of the private individual data is personal data such as an address for a private individual data owner retrieved from one or both of the secure data center database by 715 or from the application by 725 and mapped and written to the QuickBooks application 735 for updating a billing address. The report may also include data related to any information regarding any recipients of the private individual data. A "recipient" may be any device such as a server that touches, reads, writes, copies, or transmits the private individual data. Each of these may be located in a part of the world and their location may have been identified by the geographical data integration protection system. In the embodiment, shown in FIG. 7, the data may have been read from a server or database in the United Kingdom, transmitted and used to update a billing system (e.g., QuickBooks®) located in Germany. Because the geographical data integration protection system has been made aware of the geolocation of these servers and applications, the private individual data integration protection system can be made aware of the fact that any governmental regulations within the UK, Germany, or both apply and the amount and specificity of the data presented on the report provided to the private individual data owner should reflect the necessary data to satisfy those applicable regulations.

The report to the private individual data owner may also include the time and date that the private individual data owner's private individual data was manipulated. This, again, may range in specificity with either a beginning time the private individual data was first modified or more specific data related to specific times and dates of each modification of the private individual data owner's private individual data. The time and date data presented on the report may be especially significant to a private individual data owner who may be concerned that, at a specific time and date, their private individual data may have been accessed by a nefarious party.

The report may further include a purpose indicating why the private individual data owner's private individual data was modified. In the example data integration process shown in FIG. 7, the purpose of the modification of the private individual data was to update an address in a billing application 735 such as QuickBooks®. After the private individual data owner's private individual data is used to update the billing application 735, the data integration process had stopped and the report to the private individual data owner may so indicate an end of the report.

Figure 8:
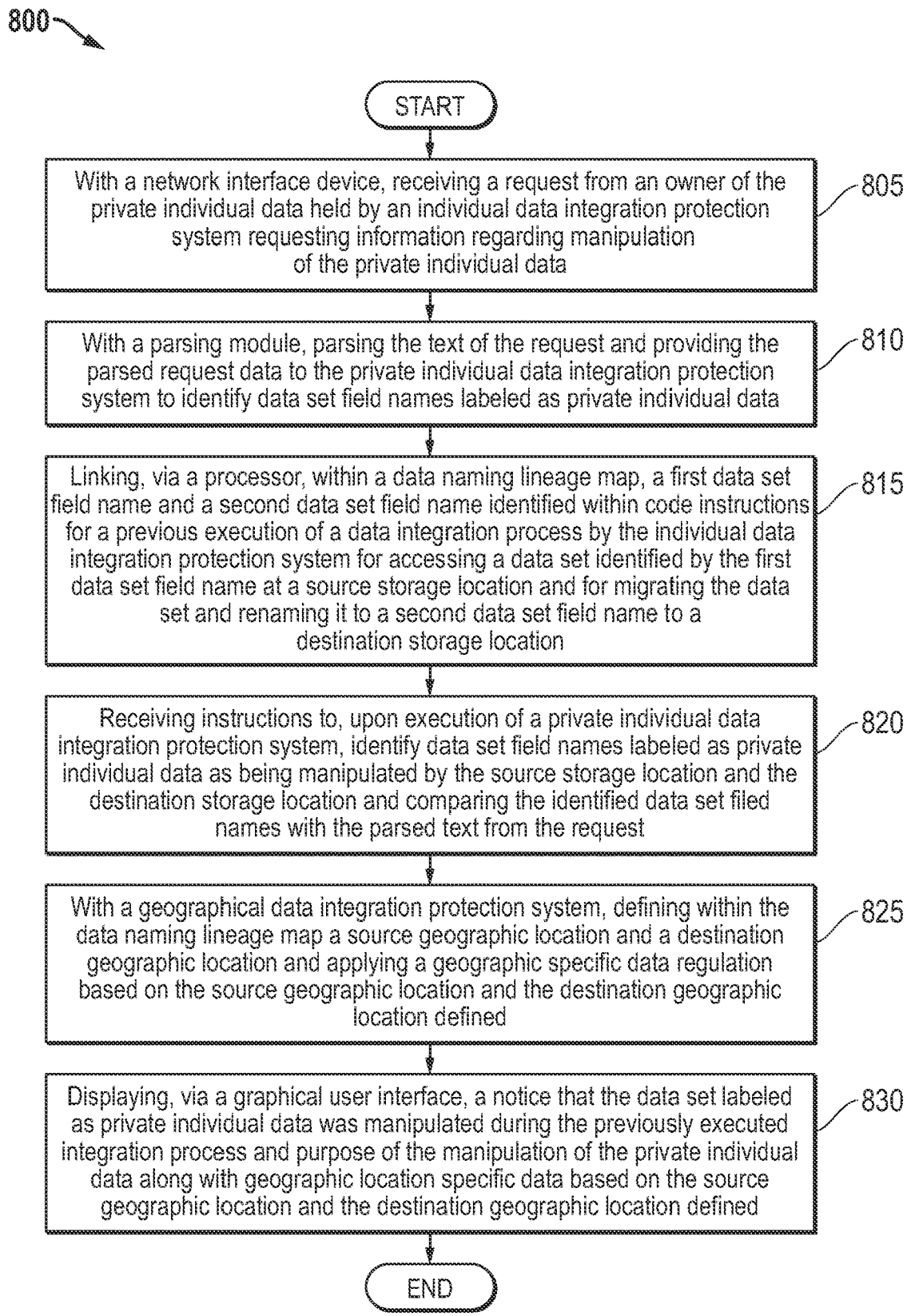
FIG. 8 is a flow diagram illustrating a method of tracking manipulation and geographic movement of private individual data model field values according to an embodiment of the present disclosure.

FIG. 8 is a flow diagram illustrating a method 800 for tracking data during a data integration process according to an embodiment of the present disclosure. The flow diagram of method 800 further shows a method of receiving a request or query from an inquiring entity such as a private individual data owner about private individual data, and after identifying and tracking manipulations of data through one or more integration processes, providing a report for response to the inquirer according to embodiments of the present disclosure.

The method 800 may begin at block 805 where a user, such as an enterprise that has deployed a business integration process, a private individual data owner, or another inquirer may submit a request or query into private individual data that is affected by one or more business integration processes. In an embodiment, the query about private individual data may be received by some type of electronic communication including an email, text message, via a telephonic call, or via a web interface, among other options. In a particular embodiment, the private individual data integration protection system may provide for a web interface to be presented to an inquirer such as a private individual data owner, or an enterprise user or service provider employee looking into a request. The web interface may be used to enter a query. This web interface may also provide the responses generated from a report on the private individual data by the private individual data integration protection system to the inquirer.

The inquiry may be received via the web interface, in an example embodiment, where a private individual data owner or another inquirer such as a government regulator or an enterprise administrator may input the query about private individual data and request a search. In at least one embodiment, the web interface may be linked through a portion of the business integration application management system operating on a service provider server systems or cloud resources or on an enterprise's server systems or cloud resources. In an aspect, the private individual data integration protection system may operate the web interface directly or may partially provide such a web interface through the business integration application management system in some embodiments. Other methods of receiving private individual data queries are also contemplated including via electronic communications such as email, IM, text, or audio communications and the private individual data integration protection system may be searched by a user from the enterprise or service provider.

The private individual data integration protection system may also interface with the geographical data integration protection system for determination of locations for reading, writing, transfers, executions of runtime processes, or other execution of actions within the business integration process or processes executed in embodiments. The geographical data integration protection system may track but also generate prohibitions for such executable actions occurring with the business integration process or processes. Finally, the geographical data integration protection system may also provide information relating to which potential governmental regulations of private individual data may need to be followed based on jurisdictions that may be relevant to operation of the business integration process or processes.

By way of example, a data integration process may include a first database or source application environment that stores an amount of private individual data for any number of private individual data owners. The data integration process may also include a second private individual data owner database which interfaces with the first database in order to obtain specific private individual data owner private individual data and process that data at, for example, a billing application. This manipulation of the private individual data owner's private individual data may have been conducted in order to update a billing address or other data related to the operation of the billing application. In this specific example, the integration application management system, via the NIC may receive a query from the private individual data owner identifying the owner and requesting a report regarding how, where, and why their private individual data was manipulated. This query may be sent to the integration application management system.

At block 810, the private individual data integration protection system of embodiments herein may interface with the parsing module described to parse with an artificial intelligence parsing system the terms of a query into private individual data received for a private individual data owner or other inquirer. The entered text of the query, such as into the web interface, may be parsed for terms and phrases, via a text parsing system utilizing one or more types of artificial intelligence. The web interface or electronic communication may simply include a query written in text in some embodiments. The web interface may also include fields in some embodiments for entering specific aspects of a query and request for a search about private individual data. For example, a field for identification of one or more private individual data owners of interest or the type of information that is of concern may be used in some embodiments. Additionally, fields may be available to identify a time period of concern, locations of concern that data has been manipulated, or other specific information.

The text parsing artificial intelligence algorithms of the parsing module described herein may implement one or more of natural language understanding algorithms, question answering algorithms, machine translation algorithms, lexical semantic algorithms, distributional algorithms, and word sense disambiguation algorithms to interpret the entered query. The parsing module may apply such algorithms to identify various aspects of the query relating to identity of the private individual data owner, they types of possible private individual data of concern if specified, and other aspects such as time periods, locations, or other details entered into the query. At this stage, various parsed details will have been generated, relating to the above factors from a private individual data query, by the parsing module. These parsed factors may be applied to determine identity of types of data or to whom the data belongs from dataset field names, labels, or other details determined from metadata and labels as described in embodiments herein.

Returning to the example, once the integration application management system has received this query from the private individual data owner, the integration application management system may pass the query to the parsing module to be parsed. The parsing may detect a plurality of words or phrases that indicate what type of data the private individual data owner is asking for as well as the identity of the private individual data owner.

Proceeding to block 815, the private individual data integration protection system may interface with an internal system of a private individual data identification module that may apply one or more intelligence techniques of supervised learning systems, such as a machine learning classifier, deep learning neural networks, or other artificial intelligence, as well as correlation techniques to match the parsed query terms with the various sources, logs, aggregations, or other sources of metadata and descriptions relating to the business integration process. For example, embodiments of the private individual data identification module may match, via artificial intelligence techniques and correlation techniques, the metadata from the business integration processes or processes with forms of potential private individual data identified by parsed query terms that may have been manipulated or transferred within the business integration process or processes. Further, embodiments of the private individual data identification module may match, via artificial intelligence techniques and correlation techniques, identification of a private individual data owner of interest in a query with potential sensitive data sources or context information from metadata or labels associated with one or more relevant business integration processes.

For example, the private individual data integration protection system may search, via a processor, the mapping shapes of one or more deployed business integration processes for metadata and labels relating to data set fieldnames, mapping links, or descriptive labels mapped between an input dataset and a target dataset. The private individual data identification module take parsed elements of the query developed by the parsing module and match those with metadata or labels determined during the course of development of one or more business integration processes. For example, labels may be established and metadata generated from labels, development, actions, third party interactions, and generated runtime code sets or their transmission. Further, some metadata and labels may be generated from previous executions as recorded in execution logs that occur of the one or more business integration processes.

As described with respect to FIG. 7, the private individual data integration protection system may search across multiple visual element components of the business integration process or processes. In example embodiments, labels and metadata may be generated by the business integration process or processes to determine manipulation of data, including private individual data in some cases, via reading from, writing to, transferring, copying, or other processing during execution or based on how executions will occur based on modeling and development. Examples of labels or metadata may include labels or metadata for identifying sensitive data types or generally identifying data types from input and target dataset fieldnames, labels or metadata describing mapping transfers or other actions of the business integration process, labels or metadata describing locations of "atoms" or execution locations of runtime executable code portions of the business integration process(es), metadata from execution logs of the business integration process(es) tracked by a service provider or enterprise, any service provider metadata of business integration process development from composition logs tracked by a service provider, or the like in various embodiments described herein. The private individual data integration protection system may execute searching with the private individual data identification module using an intelligent searching mechanism such as a machine learning classifier or the like to match parsed terms from an inquiry about private individual data to search the variety of labels and metadata sources such as those described above in an embodiment. Further, the private individual data integration protection system may also inspect the data, such as metadata and labels generated by the business integration process during active execution of the business process in some embodiments. In yet other embodiments, some security measures such as imposition of geographic restrictions via the geographical data integration protection system may be implemented for future executions of business integration processes.

In an example as described in detail with respect to FIG. 7 and other embodiments herein, the method 800 may assess linking within a data naming lineage map of a mapping element, in an embodiment, between a first data set field name and a second data set field name identified within code instructions for an execution of a data integration process by a private individual data integration protection system at 815. Further, the private individual data integration protection system may also determine relevant information for connectors for accessing an input data set identified by the first data set field name(s) from a source storage location and application environment or database type, for migrating the data set, and renaming it to a second data set field name to a destination storage location or application type. As described herein, a user may have enter a first data model fieldname for a data model field value to be retrieved from an application A at a start element or connector of a visual flow chart that will make access to an identified data location and system in an embodiment. For example, in an embodiment described with reference to FIG. 3A, a user may insert a start element within a process flow for attaching contact information to a vendor or other trading partner. In such an embodiment, the user may use start element to identify a data model field value having a first data model fieldname to retrieve from an Application A and for then using with a mapping element. For example, the user may use a data model field value having a first data model fieldname "Social_Security_Number" from a NetSuite® application. This may be matched to a parsed element of the private individual data query for a private individual data owner by the private individual data integration protection system in an example embodiment using intelligence techniques and correlation algorithms as described in embodiments of the present disclosure.

The integration application management system in an embodiment when generating a start code set for retrieving the data model field value matching the entered first data model fieldname from Application A may also link the start code set to other shapes in the integration process. As described herein, the integration application management system in an embodiment may associate each of the plurality of visual elements selected by the user for inclusion within the integration process modeled by the visual flow with executable code instructions. The private individual data integration protection system may search these linked visual elements for the metadata and labels and follow matching types of information for metadata and labels relating to progression of any matched private individual data during manipulations by the business integration process. Each set of connector code instructions in an embodiment may include code instructions executable to perform an action on a data model field value (e.g., the data model field value matching the user-specified data model fieldname given). These code sets may be written in any programming code language.

Returning to the example, the parsed data from the parsing module may be sent to the private individual data identification module of the private individual data integration protection system. The private individual data identification module then compares the identity of the private individual data owner and the parsed data with the individual data model field values that have been discovered by the private individual data identification module as potentially manipulating private individual data. This comparison will result in the identification of the specific private individual data owner's data that is maintained or accessed from the first database and second database as sources of billing address, name or other identification of a private individual data owner, read from those databases, copied at those databases or other databases for transferring, and written to a database associated with the billing application of an accounting application to update the billing address of the private individual data owner as the private individual data integration protection system continues to access aspects of the business integration process as described below.

At block 820, the method 800 may include receiving instructions to, upon execution of a private individual data integration protection system, identify data set field names labeled as private individual data as being manipulated by the source storage location and the destination storage location and comparing the identified data set filed names with the parsed text from the request. This correlation step may be conducted, for example, on the mapping elements and provide a data lineage mapping information through the information handling system. It may provide details of private individual data from metadata and labels matching the parsed query elements through the lineage tracked of manipulations to the private individual data through the business integration process. The user may have inserted a connector element specific to a target application or database to represent transmitting or writing the data model field value retrieved at element to the second, target application or database. For example, the user may insert connector element for transmitting the data model field value retrieved at element to SalesForce®, and for storing it with a data model fieldname "Title."

The business integration application management system in an embodiment may receive a user instruction linking the first data model fieldname to the second data model fieldname via the map element for example. As described herein, users of the GUI describing the flow of the integration process may have used map elements to associate a first data model fieldname for a data model field value being retrieved from a first application or source with a second data model fieldname under which that data model field value will be stored at a second application or destination. For example, in an embodiment described with reference to FIG. 4, a previously created map element may associate the data model fieldname "Social_Security_Number," accessible by Application A with the data model fieldname "Title," accessible by Application B. The geographical data integration protection system in an embodiment may use this previously created map element to make the link between the data model fieldname "Social_Security_Number" and the data model fieldname "Title" within the fieldname lineage map.

The integration application management system in an embodiment may have generated a connector code set for storing the data model field value at Application B under the second entered data model fieldname. The integration application management system in an embodiment may associate the connector visual element with code instructions executable to perform an action (e.g., store) on a data model field value (e.g., the data model field value matching the user-specified data model fieldname given). As described herein, these code sets may be written in any programming code language. Thus, the process-representing elements in an embodiment may be programming language-agnostic however since the private individual data integration protection system may utilize metadata and labeling generated by the process repeating elements to model an end-to-end integration process between multiple applications that each use different naming conventions and storage structures for storage of data model field values. As a result, a single data model field value accessed at the start element and read by a connector, mapped to a second application or database, and transmitted or written to a second location at a connector element in an embodiment may be identified and tracked with the private individual data integration protection system. Thus, the private individual data integration protection system may track private individual data falling within completely different data model fieldnames (e.g., "Social_Security_Number" and "Title") used to identify the exact same data model field value at the connector element regardless of programming language used.

At block 825 in an embodiment, a geographical data integration protection system may interface with the private individual data integration protection system by first creating a fieldname lineage map associating the first data model fieldname, second data model fieldname, integration process, and action to be taken on the data model field value between Application A and Application B with one another. For example, in an embodiment described with reference to FIG. 4, the geographical data integration protection system may map each data model fieldname given to a given data model field value throughout an integration process, based on user-defined links provided via the map element. Such a fieldname lineage map in an embodiment may identify which of these data model fieldnames was applied at each application/location/enterprise involved in the integration process, and the manipulation or action (e.g., listed within column 406) performed by each of these applications/locations/enterprises during the integration process. More specifically, the geographical data integration protection system in an embodiment may map a link between the data model fieldname "Social_Security_Number" used by the NetSuite® application to describe a data model field value, and the data model fieldname "Title" used by the SalesForce® application to describe the same data model field value. Further, the access links used to read private individual data matching the parsed query and access links used to write the private individual data as tracked through data lineage in the business integration process may also yield or indicate metadata relating to location of access reads and output writes or transmissions from the business integration process or processes. For example, IP address, port identifiers, or other address information may be identified for conducting the reads, writes, copying, transfers, or other manipulation steps at servers utilized for the business integration process or processes involving the matching private individual data. In such a way, the geographical data integration protection system may track all data model fieldnames given to one or more data model field values of private individual data throughout an integration process or processes with respect to location in an embodiment. Further, some indication of any restrictions that may have been placed on business integration process manipulations as to geographic locations by the geographical data integration protection system may be recorded and used in reporting that data may have been barred or limited from being accessed from, written to, copied to, transferred to, or stored at a particular geographic location according to embodiments of the present disclosure.

An integration process-modeling user interface may allow a user of the integration application management system to model an integration process between an enterprise system/network and outside entities, and may include several business process data exchanges shown in FIG. 2. For example, the enterprise system/network may be involved in a business process data exchange via network with a trading partner 1, a trading partner 2, a service provider located in the cloud, or an enterprise cloud location. In some embodiments, a single data integration process may involve movement of data model field values among several different entities, in series. For example, a data model field value may travel via network from the enterprise system, to enterprise cloud, then cloud service provider, and ultimately to trading partner. A data model field value may move, undergoing temporary or permanent storage or other manipulations, through potentially hundreds of such different physical servers, at potentially hundreds of geographic locations within a single integration process in some embodiments.

The geographical data integration protection system in an embodiment may receive metadata appended to a data model field value transferred pursuant to the previously executed data integration process from an endpoint or destination location. As a data model field value travels from a source server to a destination server, via potentially hundreds of intermediate servers or locations, metadata appended to the data model field value may record each storage event. For example, metadata appended to a data model field value may be edited at each location at which it is stored (either temporarily at an intermediate location, or permanently at a final destination) to include an identification of the server at which it is being stored. Each server in an embodiment may be identified in metadata according to various formats, such as IP address, URL, port, database name, etc. The metadata appended to the data model field value as it is stored at its final destination pursuant to the data integration process may thus record the identification of every server (including a source, a destination, and all intermediate stops along the way) at which it was stored during the integration process, even if only temporarily. The geographical data integration protection system in an embodiment may request and retrieve this metadata from the final destination storage location of the data model field value following execution of the data process. The geographical data integration protection system in an embodiment may use a geolocation service to identify geographical locations of servers through which a data model field value passed during the previously executed integration process. Similarly, the private individual data integration protection system may identify those data model filed values where private individual data is passed during execution of the data integration process.

The method 800 may continue, at block 830, with displaying, via a graphical user interface, a notice that the data set labeled as private individual data was manipulated during the previously, or currently, executed integration process and purpose of the manipulation of the private individual data along with geographic location specific data. The private individual data integration protection system may generate a report and populate a database or chart of activity and classes of identified private individual data that is relevant to a received query. This report or database of activity for matched private individual data from a query in a relevant business integration process may be based on the above determinations of matching private individual data, where it was accessed from, where it was transferred, sent, copied, stored or written two, and the nature of the target location and what was being done during the manipulation of the data as discerned by the private individual data integration protection system. A report may be prepared by the private individual data integration protection system for the inquiring person or entity with the answers to what private individual data was manipulated by the business integration process or processes, and from what applications or databases the manipulation of a private individual data owner's private individual data were sourced and ultimately transmitted or stored. Further response information in the report generated by the private individual data integration protection system may include information of how, why, and when the private individual data was manipulated, along with any available geographical data associated with the manipulation. This report may be presented to the private individual data owner in any level of granularity such that the report satisfies any governmental regulations within any geographical region that the private individual data owner's data was manipulated. It is anticipated that the private individual data owner's data may be have been manipulated within multiple geographical regions and, as such, multiple governmental regulations may be applicable when considering what information to present in the report to the private individual data owner as described in some embodiments herein.

In an example embodiment, the private individual data owner, enterprise user, or other inquiring person who submitted the query may be presented with a report giving details of the private individual data manipulation as described for the business integration process or processes. This may be provided by any form of communication. In a particular embodiment, the same web interface used to submit the query may be used to furnish the report responding to the query. The web interface in an embodiment may give details as to from where, how manipulated, to what target or targets, for what purpose, when and on what dates, and what geographic locations in a responsive report may be involved where such data is able to be discerned by the private individual data application protection system from metadata, labels, code or the like. In embodiments herein, the responsive report may be an automatic response via the web interface to the query that was received. In an embodiment, a natural language generator may be used to generate responses for the report format. In one example embodiment, a question and answer algorithm may be used to provide automatic responses query questions responding with the contents of a report generated by the private individual data integration protection system about the private individual data query.

Returning to an example embodiment described herein, the private individual data integration protection system may then produce a report to the private individual data owner descriptive of this manipulation of their data. The report may provide the purpose of the manipulation: "your private individual data was processed for the purpose of updating your address in our company billing system." The report may provide a category assigned to manipulated data: "personal" and may list the data manipulated (i.e., full name, address, phone number, date of birth, email or country, state, city, and street address). The report may also indicate the time the private individual data was manipulated: Feb. 27, 2020 at 7:41 am ET. The report may also include information regarding the geolocations of the manipulation of the data at any time during the execution of the data integration process: "your private individual data was read from the company's private secured data center database in the United Kingdom or our CRM system in the United States and updated at the billing application located in Germany." As such the report may be sent to the private individual data owner in order to fulfill governmental regulation requirements concerning the manipulation of the private individual data owner's data within the data integration process. The method may then end.

The blocks of the flow diagram in FIG. 8 discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a private individual data integration protection system comprising:
   a processor, memory, and network interface device;
   the processor to parse elements of text of a received electronic query including a request about private individual data for a private individual data owner;
   the processor to execute code instructions of the private individual data integration protection system to identify data set field names via metadata and labels from a modeled business integration process by matching private individual data identified in the query with manipulated private individual data from the modeled business integration process that was modeled via a graphical user interface utilizing a plurality of visual elements representing integration process steps and deployed with a business integration application management system, where the private individual data integration protection system links a first data set field name of the source input dataset and a second data set field name of the destination target dataset from a data naming lineage map identified from code instructions for execution of the modeled business integration process; and the processor to generate a responsive report on indicating the private individual data that matches the received query was manipulated during the executed business integration process.

2. The information handling system of claim 1, further comprising:
the responsive report including an indication purpose of the manipulation of the matching private individual data.

3. The information handling system of claim 1, further comprising:
the responsive report including an identity of a private individual data owner matching private individual data from the received query.

4. The information handling system of claim 1, further comprising:
the processor to execute code instructions of a geographical data integration protection system to define within the data naming lineage map a source geographic location and a destination geographic location of the manipulation steps of the matching private individual data during the business integration process.

5. The information handling system of claim 1 further comprising:
the processor to execute code instructions of the private individual data integration protection system to identify plural process steps performed on the data set field value matched to the matching private individual data, including any interim manipulation events between accessing the source input data set and the transmission to the destination target dataset during the business integration process.

6. The information handling system of claim 1 further comprising:
the processor to execute code instructions of the private individual data integration protection system to identify a source input database or a source input application environment for the source input dataset having matching private individual data from the received query.

7. The information handling system of claim 1 further comprising:
the processor to execute code instructions of the private individual data integration protection system to identify a destination target database or a destination target application environment for the destination target dataset having matching private individual data from the received query.

8. The information handling system of claim 1 further comprising:
the processor to execute code instructions of the private individual data integration protection system to classify private individual data manipulated within the data integration process as in one of a category selected from personal identification data, personal financial data, personal sensitive data, personal health data, personal national data, and personal security data.

9. The information handling system of claim 1, further comprising:
the processor to execute code instructions of the private individual data integration protection system to identify a date and time indicating when the private individual data was manipulated.

10. The information handling system of claim 1, further comprising:
the network interface device to receive the electronically received query from a web interface provided to an inquiring user submitting the electronically received query; and
the network interface device to transmit the responsive report on the private individual data matching the electronically received query to the web interface responding to the electronically received query.

11. A method for tracking data during a data integration process comprising:
receiving a query, submitted electronically, involving a request about private individual data;
parsing elements of text of the query, via a processor;
executing instructions of a private individual data integration protection system to identify data set field names via metadata and labels from the modeled business integration process matching private individual data identified in the query as being manipulated from a source input dataset to a destination dataset by execution of the business integration process, where the executed business integration process is modeled via a graphical user interface utilizing a plurality of visual elements representing integration process steps; and
transmitting a responsive report on the private individual data matching the received query, via a network interface device to a graphical user interface, indicating that the matching private individual data was manipulated during the executed business integration process.

12. The method of claim 11 further comprising:
linking, with the private individual data integration protection system, a first data set field name of the source input dataset and a second data set field name of the destination target dataset from a data naming lineage map identified from code instructions for execution of the business integration process.

13. The method of claim 11 further comprising:
defining within a data naming lineage map a source geographic location and a destination geographic location with execution of instructions of a geographical data integration protection system.

14. The method of claim 13 further comprising:
reporting the source geographic location and the destination geographic location in the responsive report on the private individual data matching the received query involving the request about private individual data.

15. The method of claim 11 further comprising:
parsing elements of text of the query with a natural language recognition algorithm executed in a parsing module.

16. The method of claim 11 further comprising:
correlating the query with private individual data manipulated within the business integration process via a machine learning classifier correlating parsed elements of the received query with metadata and labels from the modeled business integration process.

17. An information handling system operating a private individual data integration protection system comprising:
the processor executing code instructions of the private individual data integration protection system to receive an electronically received query involving a request about private individual data and configured to parse elements of text of the electronically received query;
the processor linking, within a data naming lineage map, a first data set field name and a second data set field name identified within code instructions for execution of a deployed business integration process for accessing a data set identified by the first data set field name at a source storage dataset and for migrating the data set and renaming it to a second data set field name to a destination storage location as part of the business integration process generated from a modeled business integration process modeled via a graphical user interface utilizing a plurality of visual elements representing integration process steps;

the processor to execute a private individual data integration protection system to identify data set field names labeled as private individual data that were manipulated by the deployed business integration process from the source storage location and to the destination storage location; and a network interface device transmitting a responsive report that is responsive to the electronically received query to a graphical user interface displaying a notice that the data set labeled as private individual data was manipulated during execution of the deployed business integration process and including the source storage location and the destination storage location.

18. The information handling system of claim 17, further comprising:

the processor to execute a machine learning classifier to correlate parsed elements of the electronically received query with private individual data manipulated within a deployed business integration process from metadata and labels from a modeled business integration process.

19. The information handling system of claim 17, further comprising:

the network interface device to receive the electronically received query from a web interface provided to an inquiring user submitting the electronically received query; and the network interface device to transmit the responsive report on the private individual data matching the electronically received query to the web interface.

20. The information handling system of claim 17 further comprising:

the processor to execute code instructions of the private individual data integration protection system to identify a date and time indicating when the private individual data was manipulated in the deployed business integration process.

\* \* \* \* \*